United States Patent
Dinnage

(10) Patent No.: US 8,808,424 B2
(45) Date of Patent: Aug. 19, 2014

(54) APPARATUS AND METHOD FOR REMOVING $CO_2$ FROM A PRODUCTION PLANT DISCHARGE

(75) Inventor: Paul Dinnage, New Braunfels, TX (US)

(73) Assignee: Munters Corporation, Selma, TX (US)

( * ) Notice: Subject to any disclaimer, the term of this patent is extended or adjusted under 35 U.S.C. 154(b) by 106 days.

(21) Appl. No.: 13/370,863

(22) Filed: Feb. 10, 2012

(65) Prior Publication Data

US 2012/0204717 A1 Aug. 16, 2012

Related U.S. Application Data

(60) Provisional application No. 61/441,686, filed on Feb. 11, 2011.

(51) Int. Cl.
*B01D 53/02* (2006.01)
*B01D 53/26* (2006.01)
*B01D 53/06* (2006.01)
*B01D 53/14* (2006.01)

(52) U.S. Cl.
CPC ............ *B01D 53/261* (2013.01); *Y02C 10/08* (2013.01); *B01D 2251/404* (2013.01); *B01D 2253/106* (2013.01); *Y02C 10/04* (2013.01); *Y02C 10/06* (2013.01); *B01D 2258/0283* (2013.01); *B01D 53/06* (2013.01); *B01D 53/1425* (2013.01); *B01D 2251/60* (2013.01); *B01D 2252/30* (2013.01); *B01D 2257/80* (2013.01); *B01D 53/263* (2013.01); *B01D 2253/102* (2013.01); *B01D 2253/108* (2013.01); *B01D 53/1475* (2013.01); *B01D 2253/116* (2013.01); *B01D 2251/302* (2013.01); *B01D 2253/112* (2013.01); *B01D 2257/504* (2013.01)
USPC .................................... 95/91; 95/117; 95/139

(58) Field of Classification Search
CPC .. B01D 53/06; B01D 53/1475; B01D 53/261; B01D 53/263; B01D 53/1425; B01D 2251/302; B01D 2251/404; B01D 2251/60; B01D 2252/30; B01D 2253/102; B01D 2253/106; B01D 2253/112; B01D 2253/116; B01D 2257/504

USPC ................................................ 95/91, 117, 139
See application file for complete search history.

(56) References Cited

U.S. PATENT DOCUMENTS 2,992,703 A * 7/1961 Vasan et al. .................. 95/93
5,351,497 A 10/1994 Lowenstein
(Continued)

FOREIGN PATENT DOCUMENTS

EP 1 950 271 A1 7/2008
GB 1100313 1/1968
(Continued)

OTHER PUBLICATIONS

NETL Report, "Cost and Performance Baseline for Fossil Energy Plants vol. 1: Bituminous Coal and Natural Gas to Electricity," DOE/NETL-2010/1397, Revision 2, pp. 1-626, Nov. 2010.
(Continued)

*Primary Examiner* — Christopher P Jones
(74) *Attorney, Agent, or Firm* — Oliff PLC

(57) ABSTRACT

A method and apparatus for removing water vapor from the flue gas stream of an industrial process, including flue gas from a power station. The apparatus including a moisture transfer device, a cooling device, and an optional enthalpy exchange device. The method including running high volumes the flue gas through the moisture transfer device, the cooling device, and the enthalpy exchange device to remove substantially all of the water vapor from the flue gas stream. Also, a method and apparatus for capturing $CO_2$ from flue gas with very low water vapor content. The apparatus including one or more towers packed with a solid sorbent, or including a liquid sorbent. The $CO_2$ from the water vapor free $CO_2$ stream is sorbed by the sorbent and captured for later use.

21 Claims, 7 Drawing Sheets

(56) References Cited

U.S. PATENT DOCUMENTS

| | | | |
|---|---|---|---|
| 5,890,372 | A | 4/1999 | Belding et al. |
| 6,745,826 | B2 | 6/2004 | Lowenstein et al. |
| 7,101,414 | B2 | 9/2006 | Dinnage et al. |
| 7,269,966 | B2 | 9/2007 | Lowenstein et al. |
| 2005/0150378 | A1 | 7/2005 | Dunne et al. |
| 2005/0217481 | A1 | 10/2005 | Dunne et al. |
| 2011/0247494 | A1 | 10/2011 | Dinnage et al. |
| 2012/0068119 | A1 | 3/2012 | Kametani et al. |

FOREIGN PATENT DOCUMENTS

| | | | |
|---|---|---|---|
| WO | WO 2010/134284 | A1 | 11/2010 |
| WO | WO 2010/149669 | A1 | 12/2010 |
| WO | WO 2010/149674 | A1 | 12/2010 |
| WO | WO 2011/035896 | A1 | 3/2011 |

OTHER PUBLICATIONS

"Fossil Energy Power Plant Desk Reference," Bituminous Coal and Natural Gas to Electricity Summary Sheets, DOE/NETL-2007/1282, pp. 1-86, May 2007.

Apr. 25, 2012 International Search Repot and Written Opinion issued in International Application No. PCT/US2012/024666.

Apr. 25, 2012 International Search Report and Written Opinion issued in International Application No. PCT/US2012/024671.

U.S. Appl. No. 13/370,976, filed Feb. 10, 2012 in the name of Paul Dinnage.

Aug. 22, 2013 International Preliminary Report on Patentability issued in International Application No. PCT/US2012/024666.

* cited by examiner

PICKUP OF CO2 AT 0-1% CO2 WITH RH AT 1.25%

CO2 EQUILIBRIUM IN 10% AND 100% CO2 ENVIRONMENT AT 20 TO 105C

US 8,808,424 B2

APPARATUS AND METHOD FOR REMOVING $CO_2$ FROM A PRODUCTION PLANT DISCHARGE

This nonprovisional application claims the benefit of U.S. Provisional Application No. 61/441,686, filed Feb. 11, 2011.

BACKGROUND

Exhaust stacks of power plants and other fossil fuel burning machinery contain high levels of both water vapor and $CO_2$. There is much discussion regarding the removal and capture of $CO_2$ from these streams in an effort to abate global warming concerns. However, adsorbent and absorbent materials, which are attracted to $CO_2$, also have a strong or preferential attraction for $H_2O$, thus their use in $CO_2$ capture has thus far not been considered practical.

State of the art systems thus far developed utilize amines (monoethanolamine (MEA), for example) or amino acid salts to absorb the $CO_2$ in an absorption unit and then transfer the amines to a stripper unit where heat, or heat and a reduction in pressure are used to desorb the $CO_2$ into a separate concentrated stream. The concentrated $CO_2$ stream is then available for use or sequestration.

A primary factor in preventing an increased adoption of this technology for sequestration is the energy penalty incurred through the desorption process. NETL report "Cost and Performance Baseline for Fossil Energy Plants Volume 1: Bituminus Coal and Natural Gas to Electricity" Vol. 1, DOE/NETL-2007/1281, (revised November 2010), details capital and operating costs for various types of power plants with and without carbon capture, and is summarized in "Fossil Energy Power Plant Desk Reference (DOE/NETL-2007/1282). Conclusions of the study show power plant efficiency is reduced from 6-12 percentage points with the addition of Carbon Capture and Sequestration (CCS).

The loss in performance is primarily due to the high thermal requirement for stripping the $CO_2$ from the amine solution. For example, in the detailed report noted above, case 13 and 14 of a Natural Gas Combined Cycle (NGCC) plant operates without CCS and produces 555 MW of power with a Net plant efficiency of 50.2% (HHV) (see table 5-7). With CCS, the output is reduced to 473 MW (14% reduction in power) and Net Efficiency reduced to 42.8% (HHV) (See Exhibit 5-18). A portion of the loss in output is due to the physical operation of the secondary amine system, and the added demand of compressing the $CO_2$ (totaling approximately 27 MW of required power to achieve). However, the larger loss is due to the Steam Turbine output reduction as heat is transferred for amine stripping (or regeneration). In the above examples 188 MW of thermal energy is transferred from productive use powering the Low Pressure Turbine to strip the amine solution, resulting in a loss of 54 MW of electrical output.

The required thermal energy for the stripper in this example amounts to 3,716 KJ/KG of $CO_2$ stripped. This is considerably higher than the specific heat of vaporization of $CO_2$, which is just 571 KJ/KG. Theoretically $CO_2$ should be able to be adsorbed and desorbed by a sorbent in a similar fashion to water vapor being adsorbed and desorbed by a desiccant. In the case of desiccant regeneration, energy needs have been demonstrated to require only 125% of the heat of condensation and certainly below 200%. It would then follow that the same should be true for $CO_2$ with an appropriate sorbent, should water vapor not be present to detract from the adsorption/desorption process. Therefore, given the $H_2O$ example, it can be concluded that $CO_2$ should be able to be adsorbed for a level close to the heat input in the range of 125% to 200% of 571 KJ/KG heat of condensation, or between 714 and 1141 KJ/KG.

There is a growing market for the use of $CO_2$ sources for Enhanced Oil Recovery (EOR). Currently it is generally accepted that the market is willing to pay $20 a ton for the economical use of $CO_2$ for such purposes. However, the high-energy penalties of the current state of the art process cannot support such a low price, without additional subsidies. Current discussions pick an achievable cost of not lower than $38/ton $CO_2$ with the state-of-the-art amine process. The reduction in heat utilization for desorption disclosed herein could play a key role in helping to reduce production costs of $CO_2$ through sequestration closer to market price for $CO_2$ as a valued commodity.

SUMMARY

Disclosed herein is a method and apparatus for removing water vapor from the stack of a fossil fuel burning facility using substantially only the residual heat energy in the stack gas stream to perform the work. Having removed the water vapor, physical adsorption of $CO_2$ via numerous sorbents becomes possible, as the $CO_2$ no longer competes with the favored water molecule for the attention of the sorption sites. Desorption of the sorbent can now be carried out via a thermal swing process where the heat required can approach the heat of vaporization plus the sorbent's particular heat of sorption plus parasitic losses. A significant portion of this heat can be supplied by waste heat sources below 100 C. The significant reduction in heat required for sorbate regeneration allows more energy to be put to use generating the desired electrical output.

In the discussions below adsorption, absorption and sorption are used interchangeably, as they are details of the mechanism of attraction of a particular sorbent. As the most general intent of this disclosure is to detail a cycle for dehydration of a hot gas stream for use in a secondary process, the precise process of sorption may also be generalized to any of the above terms. The same statement is true for the use of terms sorbent, adsorbent and adsorbent, which may all be used interchangeably.

DETAILED DESCRIPTION OF EMBODIMENTS

A typical effluent (exhaust) gas stream can have up to about 10% $H_2O$ and 10% $CO_2$ loading. The temperature of the stream varies greatly depending on the efficiency of the plant and need for wet scrubbers. In particular, the newest high-efficiency combined cycle plants have the lowest stack temperature and may require preheating or a reduction in the output of the secondary turbine, which results in a higher stack temperature before the method described below may be used. However, many if not most installed equipment does indeed possess suitable waste heat in the stack stream.

Stack gas (i.e., air and products of combustion after combustion) to be dehumidified may have a minimum temperature of 120° C., such as 130° C., 132° C., 135° C., 140° C., 150° C., 160° C., 163° C. or other values significantly higher. In the case of a non-combined cycle plants the stack temperature may be even higher. If the stack air temperature is below this level it may be heated to achieve a higher temperature.

$H_2O$ Vapor Removal $H_2O$ vapor may be removed from the stack gas before $CO_2$ capture. The apparatus for removing $H_2O$ vapor from the stack gas may include the following three components, which are described in more detail below: (1) a moisture transfer device; (2) a cooling device; and (3) an enthalpy exchange device. Additional components may be added as desired and required without deviating from the scope of this disclosure.

Moisture Transfer Device

The moisture transfer device may include any known means for transferring moisture from one gas stream to another gas stream. The moisture transfer device may include, for example, a rotary bed sorption system or a liquid desiccant system.

Figure 1:
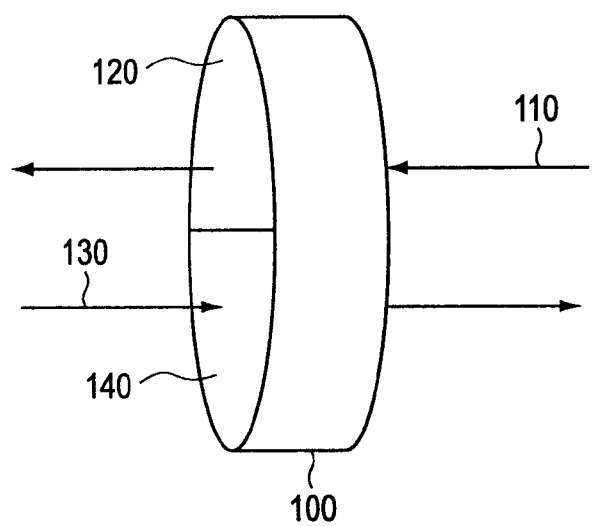
FIG. 1 shows an embodiment of a solid desiccant moisture transfer device.

Referring to FIG. 1, the rotary bed sorption system may include a desiccant wheel 100 that may deliver low dew points, utilizing molecular sieve, silica gel, LiCl or blends of molecular sieves with other desiccants or other desiccants. The desiccant wheel 100 may have a corrugated structure that is loaded with desiccant and rotates at low speeds. A wet gas stream 110 with low relative humidity enters a desorption portion 120 of the desiccant wheel where moisture is transferred from the desiccant wheel is to the gas stream, thus reducing the temperature of the gas stream. The desorption portion of the desiccant wheel that transferred moisture to the gas stream is thus dried. As the desiccant wheel turns, the dried portion of the desiccant wheel is rotated to a different location within the rotary bed sorption system. A second gas stream 130 is then transmitted through an adsorption portion 140 of the desiccant wheel, where the desiccant removes moisture from the gas stream 130 resulting in a drier gas stream 150 exiting the adsorption portion of the desiccant wheel. Thus, a moist desiccant wheel is generated. The moist desiccant is then moved by rotation of the desiccant wheel to a desorption position where it may be used to add water to gas stream 110.

The rotary bed sorption system may use any suitable desiccant known in the art. Such desiccants may include silica gel substrates, molecular sieves, and alumina, as well as desiccant salts such as LiBr and LiCl, and $CaCl_2$ contained within a corrugated or extended surface substrate.

The rotary bed sorption system may use one or more isolation loops to reduce cross-contamination between sorption and desorption zones of rotary sorption beds caused by pressure imbalances and large vapor pressure differences of the various fluid streams, such as the system described in U.S. Pat. No. 7,101,414, which is incorporated by reference herein in its entirety.

A mass of a sorbent material is rotated so that, in a cycle of operation, a given volume of the sorbent mass sequentially passes through first, second, third, fourth, fifth, and sixth zones, before returning to the first zone. A process fluid stream is passed through the sorbent mass in the first zone, and a regeneration fluid stream is passed through the sorbent mass in the fourth zone. A first isolation fluid stream is recycled in a closed loop, independent of the process fluid stream and the regeneration fluid stream, between the sorbent mass in the second zone and in the sixth zone. A second isolation fluid stream, meanwhile, is recycled in a closed loop, independent of the process fluid stream, the regeneration fluid stream, and the first isolation fluid stream, between the sorbent mass in the third zone and in the fifth zone.

Figure 2:
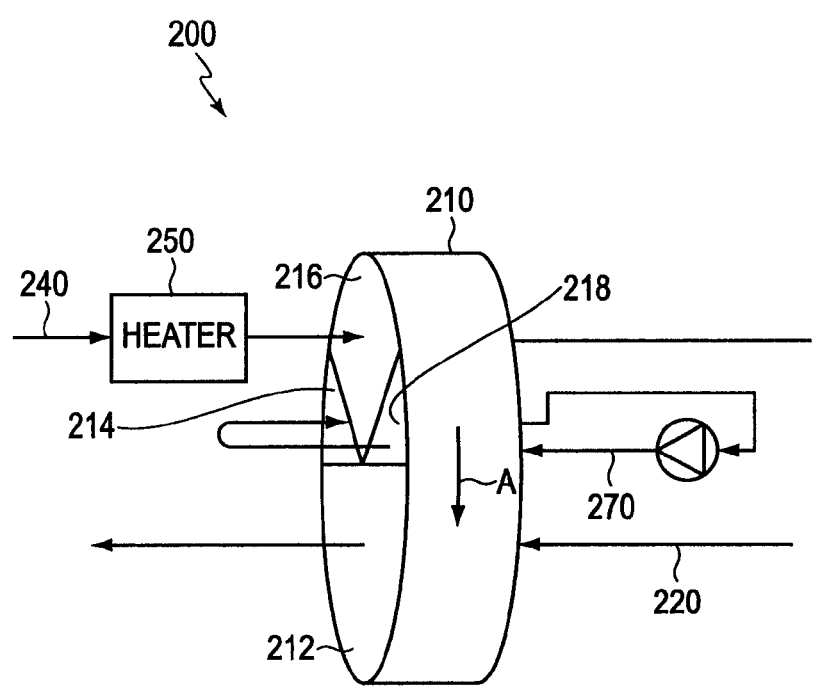
FIG. 2 shows an embodiment of a solid desiccant moisture transfer device having a purge system.

FIG. 2 illustrates an embodiment of a rotary sorption bed system 200 with a closed-loop purge system. The system includes a rotating desiccant wheel 210 of a conventional construction containing or coated with regenerable sorbent material that, in a cycle of operation, sequentially passes through a first zone 212, a second zone 214, and third zone 216, and a fourth zone 218. The desiccant wheel 210 is rotated about its axis in the direction indicated by arrow A by a known rotor mechanism (not shown).

A process fluid stream 220 carrying a sorbate (e.g., water vapor) is passed through the desiccant wheel 210 in the first zone 212, where the sorbate is sorbed (i.e., loaded) onto the desiccant wheel 210. The process fluid stream exiting the sorbent mass has a reduced sorbate concentration compared to the process fluid stream entering the sorbent mass.

A regeneration gas stream 240 is passed through the desiccant wheel 210 in the third zone 216, in a direction opposite to the flow of the process gas stream 220. The sorbate from the process gas stream that was collected in the desiccant wheel 210 is released into the regeneration gas stream. A heater 250 may optionally be provided to heat the regeneration gas stream 240 prior to its passing through the desiccant wheel 210

An isolation gas stream 270 is recycled in a closed loop, independent of the process gas stream 220 and the regeneration gas stream 240, between the desiccant wheel 210 in the second zone 214 and in the fourth zone 218. The direction that the isolation gas stream 270 flows through the desiccant wheel 210 is the same direction as the gas flowing through the zone immediately following the isolation zone in the direction of rotation of the desiccant wheel 210. In FIG. 2, for example, the isolation gas stream 270 passes through the second zone 214 in the same direction that regeneration gas stream 240 flows through the third zone 216, and passes through the fourth zone 218 in the same direction that the process gas stream 220 flows through the first zone 212. Alternatively, the direction that the isolation gas stream flows through the sorbent mass could be opposite from the direction of fluid flow through the zone immediately following the isolation zone in the direction of rotation of the sorbent mass. The desiccant wheel may rotate at speeds of approximately 8-20 rph, such as 10 rph, 15 rph, and 17 rph.

In the case of the desiccant rotor, the desiccant structure may be formed into a cylinder rather than a disk so as to be able to process significantly larger gas stream than is typically handled by desiccant rotors.

The moisture transfer device may also be a liquid desiccant system. Newly developed ionic liquids with desiccant properties may be used as a liquid desiccant, as these new ionic liquids remain in liquid form even with no water loading and, thus, may be suitable for the production of very dry gasses.

Figure 3:
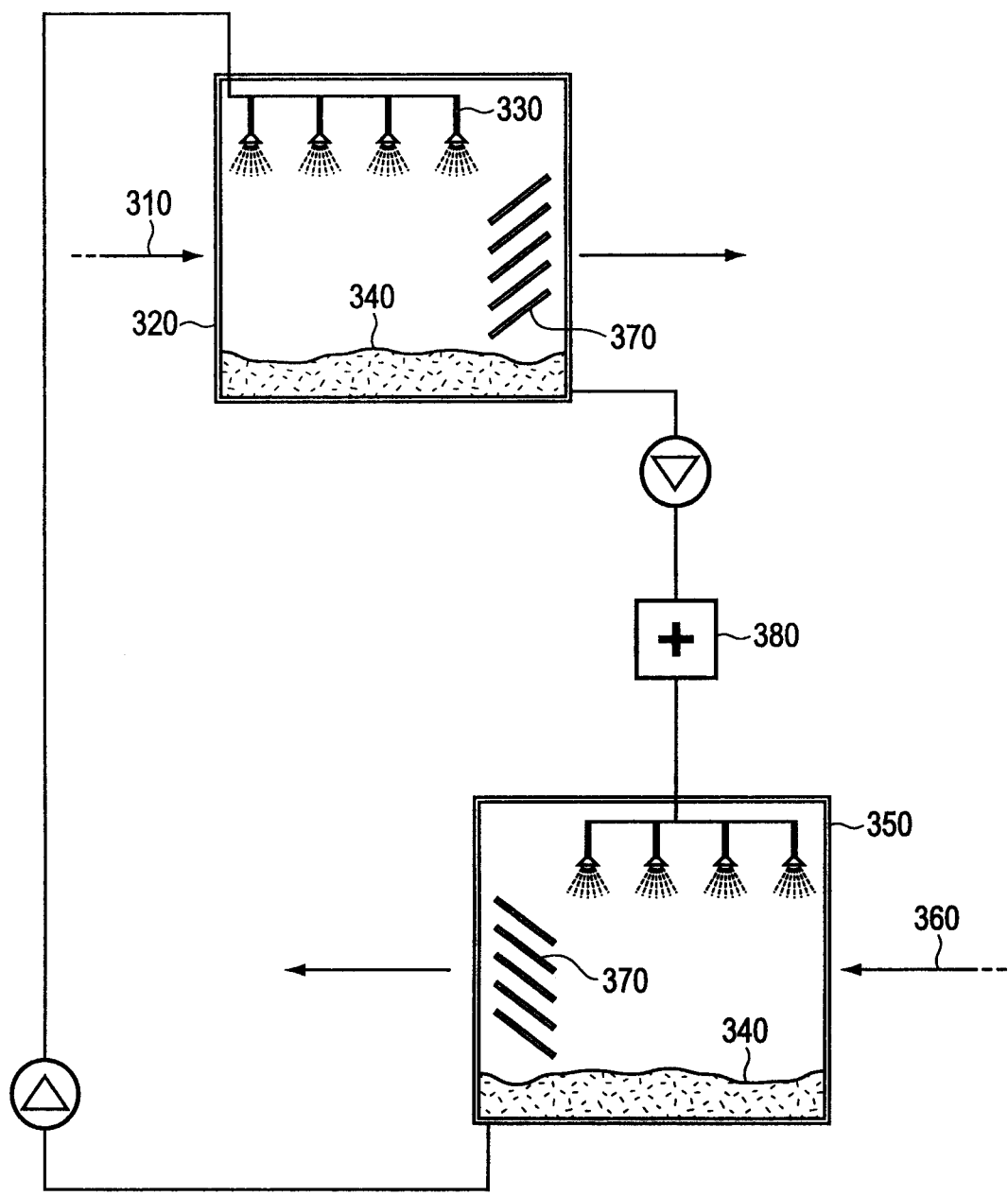
FIG. 3 shows an embodiment of a liquid desiccant moisture transfer device.

Referring to FIG. 3, the gas stream to be dehumidified 310 passes through a chamber 320. The liquid desiccant is sprayed into the chamber with the gas stream 310 by a sprayer 330. As the gas stream 310 makes contact with the desiccant it gives up its sorbate, such as water vapor to the liquid desiccant and the gas stream 310 leaves the bed with a lower sorbent concentration. The gas stream 310 leaves with a higher temperature as heat of condensation has been released during the adsorption process. The now more dilute sorbent 340, or a portion of the more dilute sorbent, is collected at the bottom of chamber 320 and then transported to a second chamber 350 where it is brought into contact with a second, low relative humidity gas stream 360 to remove the sorbate from the liquid desiccant. The liquid desiccant collects in a concentrated form at the bottom of chamber 350. After which, the liquid desiccant is returned to the first chamber, or some other adsorption site. The system may include recirculation paths limiting the amount of adsorbent that transfers from the adsorption side to the desorption side based on sorbate loading. The chambers may also include droplet separators 370. A heat exchanger 380 may regulate the temperature of the liquid desiccant as it is pumped from the first chamber to the second chamber.

The liquid desiccant that may be used in the moisture transfer device is particularly limited as typical halide salts turn to solid phase when the relative humidity drops below low levels and thus are generally not considered for use in liquid phase when trying to produce air below 20% relative humidity. Thus, the preferred liquid desiccant may be an ionic liquid; the ionic liquids may have an electric multi-pole moment, such as an electric dipole moment and/or an electric quadrapole moment. The ionic liquid may be a pure ionic liquid, i.e. a liquid substantially containing only anions and cations, while not containing other components, e.g. water. Alternatively, the initial ionic liquid may be a solution containing the ionic liquid and a solvent or further compound, e.g. water, may be used. In the most generic form, the ionic liquids may be represented by $[Q^+]_n[Z^{n-}]$, wherein Q represents a cation and Z represents an anion, such ionic liquids are disclosed in U.S. patent application Ser. No. 13/166,235 that is hereby totally incorporated by reference in its entirety.

Anions of the above ionic liquids may be selected from acetate, fluoride, chloride, thiocyanate, dicyanamide, chlorate, perchlorate, nitrite, nitrate, sulfate, hydrogensulfate, carbonate, hydrogencarbonate, methylcarbonate, phosphate, hydrogenphosphate, dihydrogenphosphate, phosphonate $HPO_3^{2-}$, hydrogenphosphonate $H_2PO_3^-$, sulfamate $H_2N-SO_3^-$, deprotonated acesulfame, deprotonated saccharine, cyclamate, tetrafluoro-borate, trifluoromethanesulfonate, methanesulfonate, nonadecafluoro-nonansulfonate and p-toluolsulfonate, methylsulfate, ethylsulfate, n-propylsulfate, propylsulfate, butylsulfate, pentylsulfate, hexylsulfate, heptylsulfate, octylsulfate, nonylsulfate, decylsulfate, long-chain n-alkylsulfate, benzylsulfate, trichloroacetate, dichloroacetate, chloroacetate, trifluoroacetate, difluoroacetate, fluoroacetate, methoxyacetate, cyanacetate, glykolate, benzoate, pyruvate, malonate, pivalate, the deprotonated or partially deprotonated form of the following monovalent or polyvalent acids: formic acid, acetic acid, propionic acid, butyric acid, valeric acid, caproic acid, enanthic acid, caprylic acid, capric acid, lauric acid, myristic acid, palmitic acid, stearic acid, arachidic acid, O-acetylsalicylic acid, sorbic acid, pivalic acid, fatty acids, isoleucine, alanine, leucine, asparagine, lysine, aspartic acid, methionine, cysteine, phenylalanine, glutamic acid, threonine, glutamine, tryptophan, glycine, valine, proline, serine, tyrosine, arginine, histidine, ornithine, taurine, sulfamic acid, aldonic acids, ulosonic acids, uronic acids, aldaric acids, gluconic acid, glucuronic acid, mannonic acid, mannuronic acid, galactonic acid, galacturonic acid, ascorbic acid, glyceric acid, xylonic acid, neuraminic acid, iduronic acid, oxalic acid, malonic acid, succinic acid, glutaric acid, adipic acid, pimelic acid, suberic acid, azelaic acid, sebacic acid, phthalic acid, isophthalic acid, terephthalic acid, maleic acid, fumaric acid, glutaconic acid, traumatic acid, muconic acid, citric acid, isocitric acid, aconitic acid, propane-1,2,3-tricarboxylic acid, trimesic acid, glycolic acid, lactic acid, malic acid, citric acid, tartaric acid, mandelic acid, 2-hydroxybutyric acid, 3-hydroxybutyric acid, 4-hydroxybutyric acid, 3-hydroxypropionic acid, 3-hydroxyisovaleric acid, salicylic acid, polycarboxylic acids, $PF_6^-$, $[PF_3(CF_3)_3]^-$, $[PF_3(C_2F_5)_3]^-$, $[PF_3(C_3F_7)_3]^-$, $[F_3C-SO_2-N-SO_2-CF_3]^-$, $[F_3C-SO_2-N-CO-CF_3]^-$, $[F_3C-CO-N-CO-CF_3]^-$, dimethylphosphate, diethylphosphate, dibutylphosphate, dimethyl phosphonate, diethyl phosphonate, dibutyl phosphonate, and mixtures thereof.

Cations of the above ionic liquids may be selected from tetramethylammonium, tetraethylammonium, tetrabutylammonium tetrahexylammonium, tetraoctylammonium, trimethylammonium, triethylammonium, tributylammonium, triethylmethylammonium, tributylmethylammonium, trihexylmethylammonium, trioctylmethylammonium, tris-(2-Hydroxyethyl)methylammonium, tris-(2-Hydroxyethypethylammonium, bis-(2-hydroxyethyl)dimethylammonium, 1,3-dimethylimidazolium, 1-ethyl-3-methylimidazolium, 1-propyl-3-methylimidazolium, 1-butyl-3-methylimidazolium, 1,2,3-trimethylimidazolium, 1,3-diethylimidazolium, 1,3-dibutylimidazolium, 1-ethyl-2,3-dimethylimidazolium, 1-butyl-2,3-dimethylimidazolium, 1-(2-hydroxyethyl)-3-methylimidazolium, 1-(3-hydroxypropyl)-3-methylimidazolium, 1-(2-hydroxypropyl)-3-methylimidazolium, 1-(4-hydroxy-butyl)-3-methylimidazolium, 1-(3-hydroxy-butyl)-3-methylimidazolium, 1-(2-hydroxy-butyl)-3-methylimidazolium, 1-(2-methoxyethyl)-3-methylimidazolium, 1-(3-methoxypropyl)-3-methylimidazolium, 1-(2-methoxypropyl)-3-methylimidazolium, 1-(4-methoxy-butyl)-3-methylimidazolium, 1-(3-methoxy-butyl)-3-methylimidazolium, 1-(2-methoxy-butyl)-3-methylimidazolium, 1-(2-ethoxyethyl)-3-methylimidazolium, 1-(3-ethoxypropyl)-3-methylimidazolium, 1-(2-ethoxypropyl)-3-methyl imidazohum, 1-(4-ethoxy-butyl)-3-methylimidazolium, 1-(3-ethoxy-butyl)-3-methylimidazolium, 1-(2-ethoxy-butyl)-3-methylimidazolium, 1-allyl-3-methylimidazolium, 1-allyl-2,3-dimethylimidazolium, N,N-dimethylmorpholinium, N,N-diethylmorpholinium, N,N-dibutylmorpholinium, N-ethyl-N-methylmorpholinium, N-butyl-N-methylmorpholinium, N,N-dimethylpiperidinium, N,N-diethylpiperidinium, N,N-dibutylpiperidinium, N-ethyl-N-methylpiperidinium, N-butyl-N-methylpiperidinium, N,N-dimethylpyrrolidinium, N,N-diethylpyrrolidinium, N,N-dibutylpyrrolidinium, N-ethyl-N-methylpyrrolidinium, N-butyl-N-methylpyrrolidinium, 2-Hydroxyethyltrimethylammonium (choline), 2-acetoxyethyl-trimethylammonium (acetylcholine), guanidinium (protonated guanidine, CAS 113-00-8), tetramethylguanidinium, pentamethylguanidinium, hexamethylguanidinium triethylmethylphosphonium, tripropylmethylphosphonium, tributylmethylphosphonium, tetraethylphosphonium, tetrapropylphosphonium, tetrabutylphosphonium, tetramethylphosphonium, and mixtures thereof.

Cooling Device

The cooling device may be any cooling device known in the art, such as condensers and heat exchangers. In embodiments, the cooling device may be a finned cooling coil or the like that rejects its heat to preferably an evaporatively cooled cooling tower. The gas exiting the desorption side of the moisture transfer device, which is warm and wet, is transferred to the cooling device where it is further cooled and dried.

Enthalpy Exchange Device

The enthalpy exchange device is not particularly limited and may be, for example, a rotary wheel heat exchanger, a moisture permeable plate heat exchanger, or a liquid desiccant loop where liquid desiccant is passed between one air stream and a second air stream. The liquid desiccant may not require that the two gas streams be passed locally to each other, as the desiccant exposure surfaces may be connected by piping. In embodiments, a low flow of liquid desiccant is used to provide the moisture exchange and a heat transfer fluid loop is flowed to provide the heat transfer between the gas streams.

The enthalpy exchange device operates in much the same way as the moisture transfer device. One difference between the moisture transfer device and the enthalpy exchange device is that the enthalpy exchange device is designed and operated in a manner wherein both latent and sensible energy is transferred from one stream to the other, as opposed to the moisture transfer device, which operates so as to maximize latent transfer while minimizing sensible transfer. It may include an enthalpy exchange material, such as corrugated aluminum coated with a desiccant, or may be a corrugated glassfiber and silicate structure, or others that are known in the art. The enthalpy exchange device may include at least two portions; an enthalpy-increasing portion and an enthalpy decreasing portion. Warm and/or moist gas enters the enthalpy-decreasing portion of the enthalpy exchange device where sensible and or latent energy of the warm gas is absorbed by the enthalpy transfer material. The enthalpy exchange material that has increased enthalpy due to absorption of energy from the warm gas stream is then exposed to cooler gas, where the enthalpy from enthalpy exchange material is transferred to the cool gas stream. The enthalpy exchange material that has been exposed to the cooler gas may then again be exposed to the warm gas stream. The enthalpy exchange device rotates at a much faster velocity than the desiccant wheel in the moisture transfer device, such as 10-30 rpm, for example, 15 rpm, 20 rpm, or 25 rpm. The enthalpy exchange device may also have a lower desiccant load and higher specific heat than the moisture transfer device.

The enthalpy exchange device may also be a liquid enthalpy exchange device. In such embodiments, the higher enthalpy gas stream may be exposed to an enthalpy exchange medium, where enthalpy from the warm gas stream is transferred to the enthalpy exchange medium, thus increasing the enthalpy of the enthalpy exchange medium. The enthalpy exchange medium with increased enthalpy is then exposed to a lower enthalpy gas stream where enthalpy of the enthalpy exchange medium is transferred to the lower enthalpy gas stream. The enthalpy exchange medium that has been exposed to the lower enthalpy gas stream may then again be exposed to a higher enthalpy gas stream. It is noted that the liquid desiccant and the gas stream need not be physically exposed to one another, thus exposed, as used above, includes any type of exposure that allows enthalpy exchange.

Reducing Gas Stream Moisture

As stated above, a need exists to reduce the amount of energy that is required to capture $CO_2$. Water has an adsorption energy of about 2326 KJ/KG, and $CO_2$ has an adsorption energy of about 580 KJ/KG. Desiccant dehumidification typically requires 3025 to 4885 KJ/KG of water vapor adsorbed. Thus, a sorbent $CO_2$ capture system, if all or almost all water vapor is removed, should use about 700 to 1165 KJ/KG, such as 755-1105 KJ/KG, 815-1045 KJ/KG, 875-990 KJ/KG, 930 KJ/KG. In one embodiment of the present disclosure, the energy required for desorbing the $CO_2$ from the gas stream is in the range of 300 to about 850 BTU/lb.

Gas stream moisture reduction method may comprise six steps, which are described in more detail below: (1) hot process exhaust gas is passed through a desorption portion of a moisture transfer device; (2) the wetted gas is then passed through a cooling device; (3) the cooled gas is then passed through an enthalpy decreasing side of an enthalpy exchange device; (4) the lower enthalpy gas is then passed through an absorption side of the moisture transfer device; (5) the further dried gas is then delivered to a $CO_2$ removal system; and (6) the dry and $CO_2$ cleansed gas is passed through an enthalpy increasing side of the enthalpy exchange device. Other various treatments may be performed before, between, and after the above steps as desired. The flow of the gas stream is not particularly limited, and may be up to 4,000,000 kg/hr for a typical power plant. If gas stream entering the system is hot enough, such as 175° C. or above, the enthalpy exchange device and corresponding process steps may not be required.

Figure 4:
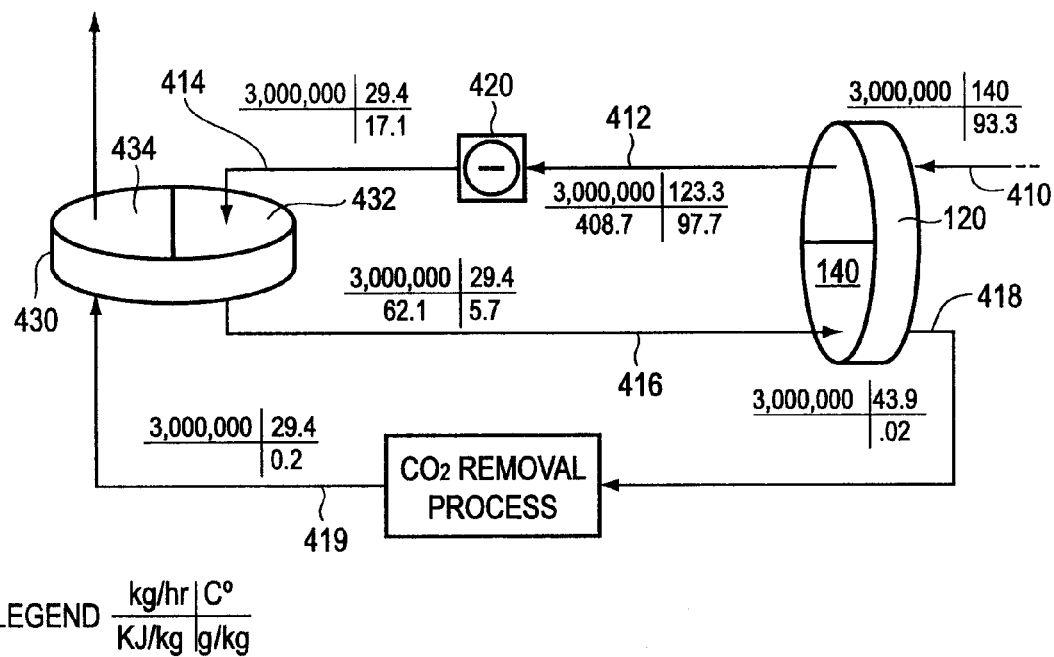
FIG. 4 shows an embodiment of a moisture removal system.

Referring to FIG. 4, hot gas or a gas stream heated by a hot gas 410 may first be passed through a desorption portion of a moisture transfer device 120 to regenerate the desiccant in the moisture transfer device. The values given in FIG. 4 are exemplary values and do not in any way limit this disclosure. The gas stream may have a temperature greater than 95° C., such as 100° C., 105° C., 110° C., 115° C., 120° C., 125° C., 130° C., 135° C. or greater. The relative humidity of the gas stream may be lower than 5%, such as 4%, 3%, 2% or 1%. The absolute humidity of the gas stream may be less than 0.1 kg/kg, such as 0.08, 0.06, 0.04, 0.03, 0.02 kg/kg or lower. Moisture from the moisture transfer device is transferred from the moisture transfer device to the gas stream. Thus, upon exiting the desorption portion of the moisture transfer device 120, the gas stream 412 will have a lower temperature, higher relative humidity, and higher absolute humidity.

If the machine and/or plant from which the gas stream is generated is fitted with a wet scrubber, then the gas stream 410 may be used to regenerate the desiccant in the moisture transfer device prior to the wet scrubbing step. If a heated gas stream was used for the regeneration step, it may either be discarded or combined with a $CO_2$ laden gas stream.

The cooled and humidified gas stream 412 is then passed through a cooling device 420, thus cooling the gas stream to close to the wet bulb temperature when cooled water from a cooling tower is used as the cooling medium, and significantly reducing its moisture content. Further mechanical cooling may be employed when wet bulb temperatures do not provide satisfactory cooling or to provide even drier gas at the discharge of the process. The cooled and saturated $CO_2$ laden gas 414 leaves with a significant reduction in temperature, but most notably a sizeable reduction in moisture content to normal or extreme normal ambient levels, such as 6 to 30 g/kg. The temperature of the gas stream exiting the cooling device 414 may be less than 32° C., such as less than 30° C., less than 27° C., less than 25° C., less than 20° C., less than 17° C., or less than 15° C. The relative humidity of the gas stream exiting the cooling means may be near the saturation level, or 100%.

The further cooled $CO_2$ laden gas stream may then be passed through an enthalpy-decreasing portion 432 of the enthalpy exchange device 430, significantly reducing the moisture content of the gas stream by a minimum of 50% and preferably more than 70%, such as 75%, or 80%. The temperature of the gas will not be significantly affected as the exchange takes place with a lower enthalpy gas stream of similar temperature.

The further dried $CO_2$ laden gas 416 may next be passed through an adsorption portion 140 of the moisture transfer device in which the desiccant has been regenerated in the first step by reducing the moisture content of the desiccant to low levels. In embodiments using a rotary bed sorption device, as the gas stream here being dried is at a temperature below the dew point of the gas stream being used for regeneration, purge loops may be employed to both help reduce the final dew point of the gas stream. As discussed above, and disclosed in U.S. Pat. No. 7,101,414, one, two or more purge loops may be required.

This dried air exiting from the absorption portion of the moisture transfer device 418 may then be delivered to the $CO_2$ removal system (one such system is disclosed separately below) for $CO_2$ removal.

Finally, the dried and $CO_2$ cleansed gas 419 may be returned from the $CO_2$ removal system and passed through the enthalpy increasing portion 434 of the enthalpy exchange device 430 where the enthalpy exchange device removes sorbent from the $CO_2$ laden gas prior to the final dehumidification in the moisture transfer system.

In embodiments where the gas stream is too dirty for direct contact with the moisture transfer device, such as in a coal fired plant, the stack air is used to heat a separate air stream having a significantly smaller volume than the stack stream, on the order of 20 to 30% of the volume, which is passed through the desiccant means in order to regenerate the desiccant. The cooled and humidified fresh air is blended with the cooled and treated stack air and may then passed through the above apparatus to remove moisture.

$CO_2$ Removal System

Embodiments of a $CO_2$ removal system to accompany the above process are described below. The entire process may be used without amino acid salts or amines as they require water as a solvent to help transport the $CO_2$. By eliminating the water, which also must go through a phase change, the energy required to proceed through the phase change of water is eliminated. In embodiments a liquid sorbent is used as it may better concentrate the $CO_2$ to high levels in a continuous manner. Solid sorbents may also be employed.

It should also be noted that other di- and multi-pole molecules may also be removed in the same manner. Thus it may be possible for this adsorption system also to remove SOx and NOx compounds in a similar fashion as $CO_2$, given that the preferential sorbent $H_2O$ is no longer present. Removal of these compounds in a similar method is hereby incorporated herein.

Liquid Sorbent

Figure 5:
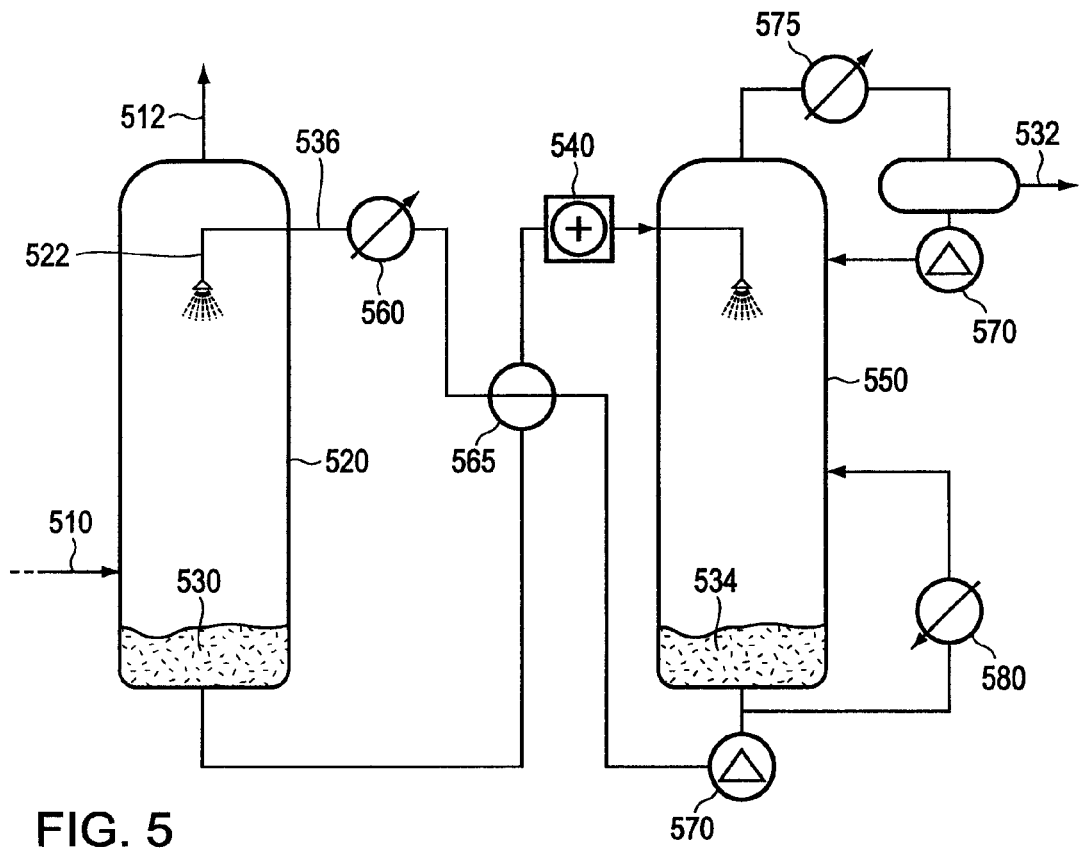
FIG. 5 shows an embodiment of a liquid desiccant $CO_2$ removal system.

In an embodiment using a liquid sorbent, shown in FIG. 5, $CO_2$ laden gas 510 from the moisture removal system described above may enter an absorber tower 520. It should also be noted that other di- and multi-pole molecules may also be removed in the same manner. Thus it may be possible for this adsorption system also to remove SOx and NOx compounds in a similar fashion as $CO_2$, given that the preferential sorbent $H_2O$ is no longer present. Thus other di- and multi-pole molecules may be interchanged with $CO_2$ in the following discussion.

A sprayer 522 sprays the liquid sorbent, where it contacts the $CO_2$ laden gas stream. The sorbent attracts the $CO_2$ and removes the $CO_2$ from the $CO_2$ laden gas stream. The gas from which the $CO_2$ has been removed is released from the absorber tower as a gas 512, where it may be returned to the moisture removal system as gas stream 419 in FIG. 4. The $CO_2$, which is bound to the liquid sorbent, is collected at the bottom of the absorber tower in a liquid state 530. The $CO_2$ laden liquid may then be pumped to a heat exchanger 540 where it is heated to a temperature sufficient to vaporize the $CO_2$ in the liquid sorbent, such as 90° C., 100° C., 110° C., 120° C., or 130° C. The liquid sorbent with the phase-separated $CO_2$ gas present is then pumped to a desorber tower 550. In the desorber tower 550, the $CO_2$ gas stream 532, which may be a dry and pure or nearly pure $CO_2$ stream, is released from the desorber tower where it may be collected and disposed of or used. As the adsorbent is primarily adsorbing $CO_2$, the concentration of the $CO_2$ stream can be very pure, namely above 80%, and preferably above 90%. The liquid sorbent is then collected at the bottom of the desorber tower 534, where it has a significantly reduced $CO_2$ concentration, preferably less than 50% of the $CO_2$ loading present after the adsorption stage. This regenerated liquid sorbent is then pumped to the absorber tower where it may be used as the liquid sorbent 536 that sorbs the $CO_2$ in the $CO_2$ laden gas stream from the moisture removal system. A cooler may condition the liquid sorbent 536 before it is re-introduced into the absorber tower. The system may also include a cooler 560, a heat exchanger 565, pumps 570, a condenser 575, and a reboiler 580.

Ionic Liquid Sorbent

In this case a liquid sorbent may be an ionic liquid that has a high affinity for multi-pole molecules, such as dipolar molecules or quadrapole molecules. In embodiments, the ionic liquids may be a pure ionic liquid, i.e. a liquid substantially containing only anions and cations, while not containing other components, e.g. water. In the most generic faun, the ionic liquids may be represented by $[Q^+]_n[Z^{n-}]$, wherein Q represents a cation and Z represents an anion, which may be produced by a process as described, for example, in U.S. patent application Ser. No. 13/166,235 that is hereby totally incorporated by reference in its entirety.

According to an embodiment, the ionic liquid may have a non-aromatic cation to sorb $CO_2$, having an electric multipole moment, out of flue gas or gas containing products of combustion. The ionic liquid may be an organic salt having a melting temperature of below 200° C., of below 100° C., and preferably below 20° C. The organic salts may be quaternary salts having a generic formula of: $[Q^+][RCO_2^-]$ or $[Q^+][RCO_3^-]$ or $[Q^+][R^iXYC^-]$ or $[Q^+][R^iR^jXC^-]$. The described method can be in particular useful for all processes in which $CO_2$ shall be removed from flue gas. Furthermore, it may be possible to use ionic liquids which selectively remove $CO_2$ while do not remove water or water vapor, i.e. hydrophobic ionic liquids may be used.

The anion may be described by one of the following structures:

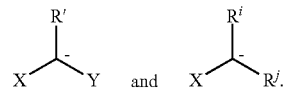

The anion may be described by the resonant or mesomeric states:

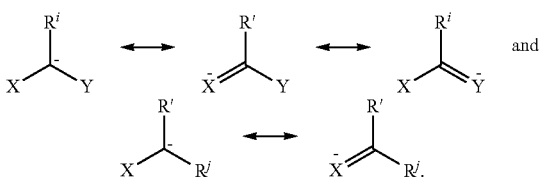

wherein X and Y may indicate, independently from each other, groups that may attract electrons due to the inductive effect or the mesomeric effect and/or that may delocalize and/or stabilize (localize) electrons. Examples for such groups may be: —CN, —NO$_2$, —NO$_3$, CO—R$^k$, —COOR$^k$, —C=N—R$^k$, —CO—NR$^k$R$^m$, —NR$^k$R$^m$, —OH, —OR$^k$, —SH, —SR$^k$, —SO—R$^k$, —SO$_2$—R$^k$, SO$_2$—OR$^k$, —PO—OR$^k$OR$^m$ (phosphonate), —I, —Cl, —Br, —F, —CCl$_3$, —CCl$_2$R$^k$, —CClR$^k$R$^m$, —CF$_3$, —CF$_2$R$^k$, —CFR$^k$R$^m$, —SO$_2$CF$_3$, —COOCF$_3$, C$_6$H$_5$, —CR$^k$=CR$^m$R$^n$, —C/CR$^m$, —CR$^k$=CR$^m$—CN, —CR$^k$=CR$^m$—NO$_2$, —CR$^k$=CR$^m$—CO—R$^k$, —CR$^k$=CR$^m$—COOR$^k$, —CR$^k$=CR$^m$—C=N—R$^n$—, CR$^k$=CR$^m$—CO—NR$^n$R$^o$, —CR$^k$=CR$^m$—NR$^n$R$^o$, —CR$^k$=CR$^m$—OR$^n$, —CR$^k$=CR$^m$—SR$^n$, —CR$^k$=CR$^m$—SO—R$^n$, CR$^k$=CR$^m$—SO$_2$—R$^n$, —CR$^k$=CR$^m$—SO$_2$—R$^n$, —CR$^k$=CR$^m$—SO$_2$—OR$^n$, —CR$^k$=CR$^m$—CF$_3$, —CR$^k$=CR$^m$—SO$_2$CF$_3$.

R$^k$, R$^m$, R$^n$, R$^o$ may, independently from each other, denote hydrogen, C$_1$- to C$_{30}$-alkyl and their aryl-, heteroaryl-, cycloalkyl-, halogen-, hydroxy-, amino-, carboxy-, formyl-, —O—, —CO—, —CO—O— or —CO—N substituted components, like methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-i-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, triacontyl, phenylmethyl (benzyl), diphenylmethyl, triphenylmethyl, 2-phenylethyl, 3-phenylpropyl, cyclopentylmethyl, 2-cyclopentylethyl, 3-cyclopentylpropyl, cyclohexylmethyl, 2-cyclohexylethyl, 3-cyclohexylpropyl, methoxy, ethoxy, formyl, acetyl or C$_n$F$_{2(n-a)+(1-b)}$H$_{2a+b}$, wherein n≤30, 0≤a≤n and b=0 or 1 (e.g. CF$_3$, C$_2$F$_5$, CH$_2$CH$_2$—C$_{(n-2)}$F$_{2(n-2)+1}$, C$_6$F$_{13}$, C$_8$F$_{17}$, C$_{10}$F$_{21}$, C$_{12}$F$_{25}$);

C$_3$ to C$_{12}$-cycloalkyl and their aryl-, heteroaryl-, cycloalkyl-, halogen-, hydroxy-, amino-, carboxy-, formyl-, —O—, —CO— or —CO—O-substituted components e.g. cyclopentyl, 2-methyl-1-cyclopentyl, 3-methyl-1-cyclopentyl, cyclohexyl, 2-methyl-1-cyclohexyl, 3-methyl-1-cyclohexyl, 4-methyl-1-cyclohexyl or C$_n$F$_{2(n-a)-(1-b)}$H$_{2a-b}$ wherein n≤0, 0≤a≤n and b=0 or 1;

C$_2$- to C$_{30}$-alkenyl and their aryl-, heteroaryl-, cycloalkyl-, halogen-, hydroxy-, amino-, carboxy-, formyl-, —O—, —CO— or —CO—O-substituted components (e.g. 2-propenyl, 3-butenyl, cis-2-butenyl, trans-2-butenyl or C$_n$F$_{2(n-a)-(1-b)}$H$_{2a-b}$ wherein n≤30, 0≤a≤n and b=0 or 1);

C$_3$- to C$_{12}$-cycloalkenyl and their aryl-, heteroaryl-, cycloalkyl-, halogen-, hydroxy-, amino-, carboxy-, formyl-, —O—, —CO— or —CO—O-substituted components, (e.g. 3-cyclopentenyl, 2-cyclohexenyl, 3-cyclohexenyl, 2,5-cyclohexadienyl or C$_n$F$_{2(n-a)-(1-b)}$H$_{2a-b}$ wherein n≤0, 0≤a≤n and b=0 or 1); and aryl or heteroaryl having 2 to 30 carbon atoms and their alkyl-, aryl-, heteroaryl-, cycloalkyl-, halogen-, hydroxy-, carboxy-, formyl-, —O—, —CO— or —CO—O-substituted components (e.g. phenyl, 2-methyl-phenyl (2-tolyl), 3-methyl-phenyl (3-tolyl), 4-methyl-phenyl, 2-ethyl-phenyl, 3-ethyl-phenyl, 4-ethyl-phenyl, 2,3-dimethyl-phenyl, 2,4-dimethyl-phenyl, 2,5-dimethyl-phenyl, 2,6-dimethyl-phenyl, 3,4-dimethyl-phenyl, 3,5-dimethyl-phenyl, 4-phenyl-phenyl, 1-naphthyl, 2-naphthyl, 1-pyrrolyl, 2-pyrrolyl, 3-pyrrolyl, 2-pyridinyl, 3-pyridinyl, 4-pyridinyl or C$_6$F$_{(5-a)}$H$_a$ wherein 0≤a≤5), wherein pairs of the R$^k$, R$^m$, R$^n$, R$^o$ may be bonded directly to each other or via C$_1$-C$_4$, which may be substituted if necessary, so that a saturated, unsaturated, or conjugated unsaturated ring may be formed.

The ionic liquid may have the generic formula [Q$^+$]$_a$[A$^{a-}$], wherein [A$^{a-}$] with the charge a— is selected out of the group consisting of the following molecules in their deprotonated and therefore anionic form:

dialkyl ketones, dialkyl-1,3-diketones, alkyl-P-keto esters, terminal alkines, linear or cyclic 1,3-thioethers, dialkyl phosphonates, dialkyl malonic acid esters, β-cyano carbonic acids and their respective alkylesters, P-alkoxy carbonic acids and their respective alkylesters, β-cyano nitriles, cyclopentadiene (optionally substituted), trialkylimines, dialkylimines, diaryl ketones, alkyl-aryl-ketones, diaryl-1,3-diketones, alkyl-aryl-1,3-diketones, β-aryloxy carbonic acids and their respective alkylesters, β-aryloxy carbonic acids and their respective arylesters, aryl-β-ketoesters, diarylphosphonates, alkyl-aryl-phosphonates, diaryl malonic acid esters, alkyl-aryl-malonic acid esters, β-cyano carbonic acids arylesters and arylimines.

The ionic liquid may satisfy the generic formula [Q$^+$]$_a$[A$^{a-}$], wherein [A$^{a-}$] is a carbanion formed by deprotonating a chemical compound out of the group consisting of: acetoacetic ester, malonic mononitrile, malonic acid dimethylester, malonic acid diethylester, acetylacetone, malonic acid dinitrile, acetone, diethylketone, methylethylketone, dibutylketone, 1,3-dithian, acetaldehyde, benzaldehyde, crotonaldehyde and butyraldehyde.

The ionic liquid may satisfy the generic formula [Q$^+$]$_a$[A$^{a-}$], wherein [A$^{a-}$] is a carbanion and wherein [Q]$^+$ is one out of the group consisting of quaternary ammonium cation [R$^1$R$^{1'}$R$^2$R$^3$N]$^+$, phosphonium [R$^1$R$^{1'}$R$^2$R$^3$P]$^+$, sulfonium [R$^1$R$^{1'}$R$^2$S]$^+$ and a hetero aromatic cation. The carbanion may be formed by deprotonating a chemical compound out of the group consisting of: acetoacetic ester, malonic mononitrile, malonic acid dimethylester, malonic acid diethylester, acetylacetone, malonic acid dinitrile, acetone, diethylketone, methylethylketone, dibutylketone, 1,3-dithian, acetaldehyde, benzaldehyde, crotonaldehyde and butyraldehyde.

R$^1$, R$^{1'}$, R$^2$, and R$^3$ may be alkyl, alkenyl, alkinyl, cycloalkyl, cycloalkenyl, aryl or heteroaryl, which may be independently substituted.

Two of the moieties R$^1$, R$^{1'}$, R$^2$, and R$^3$ may form a ring together with a hetero-atom to which they are bound. The ring may be saturated, unsaturated, substituted or unsubstituted. The chain may be interrupted by one or more hetero-atoms out of the group consisting of O, S, NH or N—C1-C$_4$-alkyl.

The hetero aromatic cation may be a 5 or 6 membered ring comprising at least one N and if necessary one O and/or one S. The hetero aromatic cation may be substituted or unsubstituted and/or annelated. The hetero aromatic cation may be selected from the group consisting of:

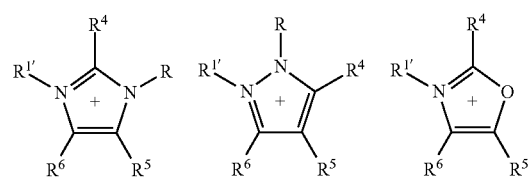

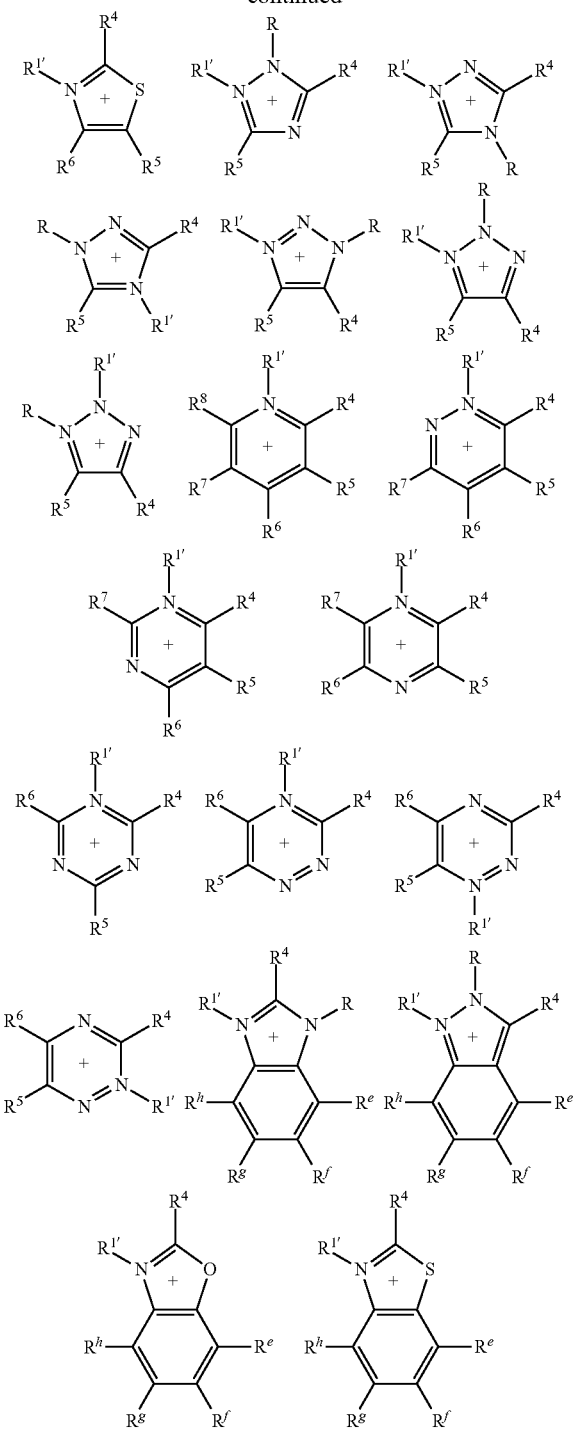

wherein the moieties R may be one of the following: hydrogen, $C_1$-$C_{30}$-alkyl, $C_3$-$C_{12}$-cycloalkyl, $C_2$-$C_{30}$-alkenyl, $C_3$-$C_{12}$-cycloalkenyl, $C_2$-$C_{30}$-alkinyl, aryl or heteroaryl, wherein the latter seven moieties may have one or more halogenic moiety and/or one to three moieties selected from the group consisting of $C_1$-$C_6$ alkyl, aryl, heteroaryl, $C_3$-$C_7$-cycloalkyl, halogen, $OR^c$, $SR^c$, $NR^cR^d$, $COR^c$, $COOR^c$, $CO$—$NR^cR^d$, wherein $R^c$ and $R^d$ may be hydrogen, $C_1$-$C_6$-alkyl, $C_1$-$C_6$-halogenalkyl, cyclopentyl, cyclohexyl, phenyl, tolyl or benzyl.

$R^1$, $R^{1'}$, $R^2$, and $R^3$ may be hydrogen, alkyl, alkenyl, alkinyl, cycloalkyl, cycloalkenyl, aryl or heteroaryl which may be independently substituted.

Two of the moieties $R^1$, $R^{1'}$, $R^2$, and $R^3$ may form a ring together with a hetero-atom to which they are bound. The ring may be saturated, unsaturated, substituted or unsubstituted. The chain may be interrupted by one or more hetero-atoms out of the group consisting of O, S, NH or N—$C_1$-$C_4$-alkyl.

$R^4$, $R^5$, $R^6$, $R^7$ and $R^8$ may be, independently of each other, hydrogen, halogen, nitro, cyano, $OR^c$, $SR^c$, $NR^cR^d$, $COR^c$, $COOR^c$, $CO$—$NR^cR^d$, $C_3$-$C_{12}$-cycloalkyl, $C_2$-$C_{30}$-alkenyl, $C_3$-$C_{12}$-cycloalkenyl, aryl or heteroaryl, wherein the latter 6 moieties may comprise one or more halogenic moiety and/or one to three moieties selected out of the group consisting of $C_1$-$C_6$-alkyl, aryl, heteroaryl, $C_3$-$C_7$-cycloalkyl, halogen, $OR^c$, $SR^c$, $NR^cR^d$, $COR^c$, $COOR^c$, $CO$—$NR^cR^d$, wherein $R^c$ and $R^d$ may be, independently of each other, hydrogen, $C_1$-$C_6$-alkyl, $C_1$-$C_6$-halogenalkyl, cyclopentyl, cyclohexyl, phenyl, tolyl or benzyl.

Two neighboring moieties of the moieties R, $R^4$, $R^5$, $R^6$, $R^7$ and $R^8$ may form, together with an atom to which they are bound, a ring which may be unsaturated or aromatic, unsaturated or saturated, wherein the chain formed by the respective moieties may be interrupted by one or more hetero-atoms out of the group consisting of O, S, NH or N—$C_1$-$C_4$-alkyl, $R^e$, $R^f$, $R^g$, and $R^h$ may be, independently of each other, hydrogen, $C_1$-$C_6$-alkyl, aryl-, heteroaryl-, $C_3$-$C_7$-cycloalkyl, halogen, $OR^c$, $SR^c$, $NR^cR^d$, $COOR^c$, $CO$—$NR^cR^d$ or $COR^c$, wherein $R^c$ and $R^d$, may be, independently of each other, hydrogen, $C_1$-$C_6$-alkyl, $C_1$-$C_6$-halogenalkyl, cyclopentyl, cyclohexyl, phenyl, tolyl or benzyl; such as hydrogen, halogen, and $C_1$-$C_6$-alkyl, or hydrogen and $C_1$-$C_6$-alkyl.

The ionic liquid that may be part of the sorbant fluid or may even form the main component of the sorbant fluid and may be designed according to specific needs. In general the ionic liquid may satisfy the generic formula $([A]^+)_a[B]^{a-}$, wherein $[A]^+$ is one out of the group consisting of quaternary ammonium cation $[R^1R^{1'}R^2R^3N]^+$, phosphonium cation $[R^1R^{1'}R^2R^3P]^+$, sulfonium cation $[R^1R^{1'}R^2S]^+$, a hetero aromatic cation and guanidinium cation $R^3R^{3'}N(C=NR^1R^{1'})NR^2R^{2'}$, such as:

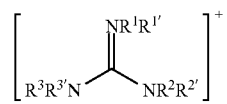

In case of the quaternary ammonium $[R^1R^{1'}R^2R^3N]^+$, phosphonium $[R^1R^{1'}R^2R^3P]^+$ or sulfonium $[R^1R^{1'}R^2S]^+$ cation, $R^1$, $R^{1'}$, $R^2$, and $R^3$ may be hydrogen or alkyl, alkenyl, alkinyl, cycloalkyl, cycloalkenyl, aryl or heteroaryl which may be independently substituted.

Two of the moieties $R^1$, $R^{1'}$, $R^2$, and $R^3$ may form a ring together with a hetero-atom to which they are bound. The ring may be saturated, unsaturated, substituted or unsubstituted. The chain may be interrupted by one or more hetero-atoms out of the group consisting of O, S, NH or N—$C_1$-$C_4$-alkyl.

In case of the guanidinium $R^3R^{3'}N(C=NR^1R^{1'})NR^2R^{2'}$ cation, $R^1$, $R^{1'}$, $R^2$, $R^{2'}$ $R^3$, $R^{3'}$ may be hydrogen or alkyl, alkenyl, alkinyl, cycloalkyl, cycloalkenyl, aryl or heteroaryl which may be independently substituted. Two of the moieties $R^1$, $R^{1'}$, $R^2$, $R^{2'}$, $R^3$, $R^{3'}$ may form a ring without or together with a hetero-atom to which they are bound. The ring may be saturated, unsaturated, substituted or unsubstituted. The chain may be interrupted by one or more hetero-atoms out of the group consisting of O, S, NH or N—$C_1$-$C_4$-alkyl.

Two of the moieties $R^1$, $R^{1\prime}$, $R^2$, $R^3$ may form a ring together with a hetero-atom to which they are bound. The ring may be saturated, unsaturated, substituted or unsubstituted. The chain may be interrupted by one or more hetero-atoms out of the group consisting of O, S, NH or N—$C_1$-$C_4$-alkyl.

The cation $[A]^+$ may be a hetero aromatic cation and may form a five- or six-membered ring comprising at least one N and if necessary one O and/or one S. The hetero aromatic cation may be substituted, unsubstituted, and/or annelated. The hetero aromatic cation may be selected from the group consisting of:

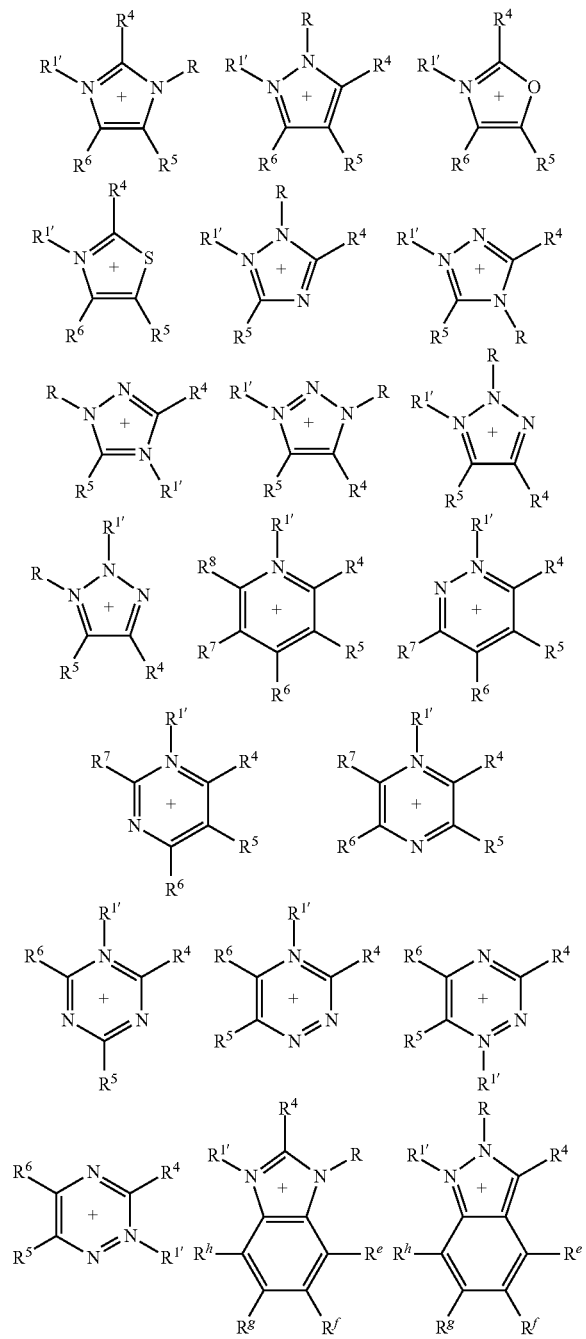

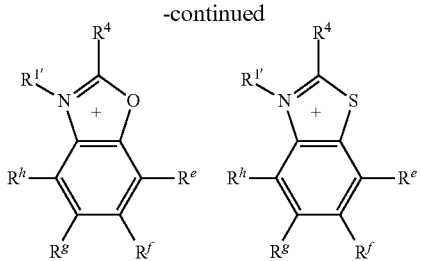

wherein the moieties R may be one of the following: hydrogen, $C_1$-$C_{30}$-alkyl, $C_3$-$C_{12}$-cycloalkyl, $C_2$-$C_{30}$-alkenyl, $C_3$-$C_{12}$-cycloalkenyl, $C_2$-$C_{30}$-alkinyl, aryl or heteroaryl, wherein the latter seven moieties may have one or more halogenic moiety and/or one to three moieties selected from the group consisting of $C_1$-$C_6$-alkyl, aryl, heteroaryl, $C_3$-$C_7$-cycloalkyl, halogen, $OR^c$, $NR^cR^d$, $COR^c$, $COOR^c$, CO—$NR^cR^d$.

$R^c$ and $R^d$ may be hydrogen, $C_1$-$C_6$-alkyl, $C_1$-$C_6$-halogenalkyl, cyclopentyl, cyclohexyl, phenyl, tolyl or benzyl.

$R^1$, $R^{1\prime}$, $R^2$, and $R^3$ may be hydrogen, alkyl, alkenyl, alkinyl, cycloalkyl, cycloalkenyl, aryl or heteroaryl which may be independently substituted.

Two of the moieties $R^1$, $R^{1\prime}$, $R^2$, and $R^3$ may form a ring together with a hetero-atom to which they are bound. The ring may be saturated, unsaturated, substituted or unsubstituted. The chain may be interrupted by one or more hetero-atoms out of the group consisting of O, S, NH or N—$C_1$-$C_4$-alkyl.

$R^4$, $R^5$, $R^6$, $R^7$ and $R^8$ may be, independently of each other, hydrogen, halogen, nitro, cyano, $OR^c$, $SR^c$, $NR^cR^d$, $COR^c$, $COOR^c$, CO—$NR^cR^d$, $C_1$-$C_{30}$-alkyl, $C_3$-$C_{12}$-cycloalkyl, $C_2$-$C_{30}$-alkenyl, $C_3$-$C_{12}$-cycloalkenyl, aryl or heteroaryl, wherein the latter six moieties may comprise one or more halogenic moiety and/or one to three moieties selected out of the group consisting of $C_1$-$C_6$-alkyl, aryl, heteroaryl, $C_3$-$C_7$-cycloalkyl, halogen, $OR^c$, $SR^c$, $NR^cR^d$, $COR^c$, $COOR^c$, CO—$NR^cR^d$, wherein $R^c$ and $R^d$ may be, independently of each other, hydrogen, $C_1$-$C_6$-alkyl, $C_1$-$C_6$-halogenalkyl, cyclopentyl, cyclohexyl, phenyl, tolyl or benzyl.

Two neighboring moieties of the moieties R, $R^4$, $R^5$, $R^6$, $R^7$ and $R^8$ may form, together with an atom to which they are bound, a ring which may be aromatic, unsaturated or saturated, wherein the chain formed by the respective moieties may be interrupted by one or more hetero-atoms out of the group consisting of O, S, NH or N—$C_1$-$C_4$-alkyl.

$R^e$, $R^f$, $R^g$, and $R^h$ may be, independently of each other, hydrogen, $C_1$-$C_6$-alkyl, aryl-, heteroaryl-, $C_3$-$C_7$-cycloalkyl, halogen, $OR^c$, $SR^c$, $NR^cR^d$, $COOR^c$, CO—$NR^cR^d$ or $COR^c$, wherein $R^c$ and $R^d$, may be, independently of each other, hydrogen, $C_1$-$C_6$-alkyl, $C_1$-$C_6$-halogenalkyl, cyclopentyl, cyclohexyl, phenyl, tolyl or benzyl, such as hydrogen, halogen, $C_1$-$C_6$-alkyl, or hydrogen and $C_1$-$C_6$-alkyl.

$[B]^{a-}$ may be carboxylate of the generic form (Vd) [$R''$—COO]$^-$, wherein $R''$ may be one organic, saturated, unsaturated, acyclic, cyclic, aliphatic, aromatic or araliphatic moiety comprising carbon or hydrogen and having one to thirty (30) carbon atoms, which may comprise one or more heteroatoms and/or which may be substituted by one or more functional groups or halogen.

The moiety $R''$ in the above carboxylate may be organic, saturated, unsaturated, acyclic, cyclic, aliphatic, aromatic or araliphatic moieties comprising carbon and having one to thirty (30) carbon atoms: $C_1$- to $C_{30}$-alkyl and the respective aryl-, heteroaryl-, cycloalkyl-, halogen-, hydroxy-, carboxy-, formyl-, —O—, —CO—, —CO—O— or —CO—N substituted components, for example, methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl, dodecyl, tridecyl, tetradecyl, pentadecyl, hexadecyl, heptadecyl, octadecyl, nonadecyl, icosyl, henicosyl, docosyl, tricosyl, tetracosyl, pentacosyl, hexacosyl, heptacosyl, octacosyl, nonacosyl, triacontyl, phenylmethyl (benzyl), diphenylmethyl, triphenylmethyl, 2-phenylethyl, 3-phenylpropyl, cyclopentylmethyl, 2-cyclopentylethyl, 3-cyclopentylpropyl, cyclohexylmethyl, 2-cyclohexylethyl, 3-cyclohexylpropyl, methoxy, ethoxy, formyl, acetyl or $C_nF_{2(n-a)+(1-b)}H_{2a+b}$ wherein n≤30, 0≤a≤n and b=0 or 1 (e.g. $CF_3$, $C_2F_5$, $CH_2CH_2-C_{(n-2)}F_{2(n-2)+1}$, $C_6F_{13}$, $C_8F_{17}$, $C_{10}F_{21}$, $C_{12}F_{25}$); $C_3$- to $C_{12}$-cycloalkyl and the respective aryl-, heteroaryl-, cycloalkyl-, halogen-, hydroxy-, amino-, carboxy-, formyl-, —O—, —CO— or —CO—O-substituted components (e.g. cyclopentyl, 2-methyl-1-cyclopentyl, 3-methyl-1-cyclopentyl, cyclohexyl, 2-methyl-1-cyclohexyl, 3-methyl-1-cyclohexyl, 4-methyl-1-cyclohexyl or $C_nF_{2(n-a)-(1-b)}H_{2a-b}$ wherein n≤30, 0≤a≤n and b=0 or 1);

$C_2$- to $C_{30}$-alkenyl and the respective aryl-, heteroaryl-, cycloalkyl-, halogen-, hydroxyl-, amino-, carboxy-, formyl-, —O—, —CO— or —CO—O-substituted components (e.g. 2-propenyl, 3-butenyl, cis-2-butenyl, trans-2-butenyl or $C_nF_{2(n-a)-(1-b)}H_{2a-b}$ wherein n≤30, 0≤a≤n and b=0 or 1);

$C_3$- to $C_{12}$-cycloalkenyl and the respective aryl-, heteroaryl-, cycloalkyl-, halogen-, hydroxy-, amino-, carboxy-, formyl-, —O—, —CO— or —CO—O-substituted components (e.g. 3-cyclopentenyl, 2-cyclohexenyl, 3-cyclohexenyl, 2,5-cyclohexadienyl or $C_nF_{2(n-a)-3(1-b)}H_{2a-3b}$ wherein n≤30, 0≤a≤n and b=0 or 1); and aryl or heteroaryl having two to thirty (30) carbon atoms and the respective alkyl-, aryl-, heteroaryl-, cycloalkyl-, halogen-, hydroxy-, amino-, carboxy-, formyl-, —O—, —CO— or —CO—O-substituted components (e.g. phenyl, 2-methyl-phenyl (2-tolyl), 3-methyl-phenyl (3-tolyl), 4-methyl-phenyl, 2-ethyl-phenyl, 3-ethyl-phenyl, 4-ethyl-phenyl, 2,3-dimethyl-phenyl, 2,4-dimethyl-phenyl, 2,5-dimethyl-phenyl, 2,6-dimethyl-phenyl, 3,4-dimethyl-phenyl, 3,5-dimethyl-phenyl, 4-phenyl-phenyl, 1-naphthyl, 2-naphthyl, 1-pyrrolyl, 2-pyrrolyl, 3-pyrrolyl, 2-pyridinyl, 4-pyridinyl or $C_6F_{(5-a)}H_a$ wherein 0≤a≤5) hydrogen, methyl, trifluoromethyl, pentafluoroethyl, phenyl, carboxy-phenyl (protonated or deprotonated), hydroxyphenyl-methyl, trichloromethyl, dichloromethyl, chloromethyl, trifluoromethyl, difluoromethyl, fluoromethyl, unbranched or branched $C_1$- to $C_{12}$-alkyl, unbranched or branched $C_1$- to $C_{12}$-mono-, di-, tri- or polyhydroxy-alkyl, unbranched or branched $C_1$- to $C_{12}$-mono-, di-, tri- or polycarboxy-alkyl (with fully deprotonated, partially deprotonated or fully protonated carboxy groups), unbranched or branched $C_1$- to $C_{12}$-mono-, di-, tri- or polycarboxy-hydroxyalkyl (with fully deprotonated, partially deprotonated or fully protonated carboxy groups), unbranched or branched $C_1$- to $C_{12}$-mono-, di-, tri- or polycarboxy-dihydroxy-alkyl (with fully deprotonated, partially deprotonated or fully protonated carboxy groups), unbranched or branched $C_1$- to $C_{12}$-mono-, di-, tri- or polycarboxy-trihydroxy-alkyl (with fully deprotonated, partially deprotonated or fully protonated carboxy groups), unbranched or branched $C_1$- to $C_{12}$-mono-, di-, tri- or polycarboxy-polyhydroxy-alkyl (with fully deprotonated, partially deprotonated or fully protonated carboxy groups), unbranched or branched $C_1$- to $C_{1-2}$-alkenyl, unbranched or branched $C_1$- to $C_{12}$-mono-, di-, tri- or polyhydroxy-alkenyl, unbranched or branched $C_1$- to $C_{12}$-mono-, di-, tri- or polycarboxy-alkenyl (with fully deprotonated, partially deprotonated or fully protonated carboxy groups), unbranched or branched $C_1$- to $C_{12}$-mono-, di-, tri- or polycarboxy-hydroxy-alkenyl (with fully deprotonated, partially deprotonated or fully protonated carboxy groups), unbranched or branched $C_1$- to $C_{12}$-mono-, di-, tri- or polycarboxy-dihydroxy-alkenyl (with fully deprotonated, partially deprotonated or fully protonated carboxy groups), unbranched or branched $C_1$- to $C_{12}$-mono-, di-, tri- or polycarboxy-trihydroxy-alkenyl (with fully deprotonated, partially deprotonated or fully protonated carboxy groups), unbranched or branched $C_1$- to $C_{12}$-mono-, di-, tri- or polycarboxy-polyhydroxy-alkenyl (with fully deprotonated, partially deprotonated or fully protonated carboxy groups). R″ may be methyl, ethyl, 1-propyl, 2-propyl, 1-butyl, 2-butyl, 2-methyl-1-propyl (isobutyl), 2-methyl-2-propyl (tert-butyl), 1-pentyl, 2-pentyl, 3-pentyl, 2-methyl-1-butyl, 3-methyl-1-butyl, 2-methyl-2-butyl, 3-methyl-2-butyl, 2,2-dimethyl-1-propyl, 1-hexyl, 2-hexyl, 3-hexyl, 2-methyl-1-pentyl, 3-methyl-1-pentyl, 4-methyl-1-pentyl, 2-methyl-2-pentyl, 3-methyl-2-pentyl, 4-methyl-2-pentyl, 2-methyl-3-pentyl, 3-methyl-3-pentyl, 2,2-dimethyl-1-butyl, 2,3-dimethyl-1-butyl, 3,3-dimethyl-1-butyl, 2-ethyl-1-butyl, 2,3-dimethyl-2-butyl, 3,3-dimethyl-2-butyl, heptyl, octyl, nonyl, decyl, undecyl or dodecyl). Carboxylate (Vd) may be trichloroacetate, dichloroacetate, chloroacetate, trifluoroacetate, difluoroacetate, fluoroacetate, methoxyacetate, cyanacetate, glykolate, benzoate, pyruvate, malonate, pivalate and the deprotonated or partially deprotonated form of the following monovalent or polyvalent acids: formic acid; acetic acid; propionic acid; butyric acid; valeric acid; caproic acid; enanthic acid; caprylic acid; capric acid; lauric acid; myristic acid; palmitic acid; stearic acid; arachidic acid; O-acetylsalicylic acid; sorbic acid; pivalic acid; fatty acids; amino acids (e.g. isoleucine, alanine, leucine, asparagine, lysine, aspartic acid, methionine, cysteine, phenylalanine, glutamic acid, threonine, glutamine, tryptophan, glycine, valine, proline, serine, tyrosine, arginine, histidine, ornithine, taurine, sulfamic acid); sugar acids (linear or cyclic form) (e.g. aldonic acids, (HOOC—(CHOH)$_n$—CH$_2$OH, n=1 to 4); ulosonic acids; uronic acids; aldaric acids (HOOC—(CHOH)n-COOH, n=1 to 4); gluconic acid; glucuronic acid; mannonic acid; mannuronic acid; galactonic acid; galacturonic acid; ascorbic acid; glyceric acid; xylonic acid; neuraminic acid; iduronic acid; dicarboxylic acids (e.g. oxalic acid, malonic acid, succinic acid, glutaric acid, adipic acid, pimelic acid, suberic acid, azelaic acid, sebacic acid, phthalic acid, isophthalic acid, terephthalic acid, maleic acid, fumaric acid, glutaconic acid, traumatic acid, muconic acid); tricarboxylic acids (e.g. citric acid, isocitric acid, aconitic acid, propane-1,2,3-tricarboxylic acid, trimesic acid); hydroxy-carboxylic acids (e.g. glycolic acid, lactic acid, malic acid, citric acid, tartaric acid, mandelic acid, 2-hydroxybutyric acid, 3-hydroxybutyric acid, 4-hydroxybutyric acid, 3-hydroxypropionic acid, 3-hydroxyisovaleric acid, salicylic acid); and polycarboxylic acids.

The anion may be written in the form [RCO$_2^-$], wherein [RCO$_2^-$] is one out of the group consisting of carboxylate, formiate, acetate, propionate, butyrate, benzoate, and salicylate.

The anion can be written in the form [RCO$_2^-$], wherein [RCO$_2^-$] is a carboxylate and wherein R is a radical out of the group consisting of $C_1$-$C_{30}$-alkyl, $C_3$-$C_{12}$-cycloalkyl, $C_2$-$C_{30}$-alkenyl, $C_3$-$C_{12}$-cycloalkenyl, $C_2$-$C_{30}$-alkinyl, aryl and heteroaryl. The moiety or radical R may comprise or include one or more halogen radicals.

The anion can be written in the form [$RCO_2^-$], wherein [$RCO_2^-$] is a carboxylate wherein R represents one to three radicals out of the group consisting of $C_1$-$C_6$-alkyl, aryl, heteroaryl, $C_3$-$C_7$-cycloalkyl, halogen, cyanide, $OR^c$, $SR^c$, $NR^cR^d$, $COR^c$, $COOR^c$, CO—$NR^cR^d$, wherein $R^c$ and/or $R^d$, is one of the group consisting of hydrogen, $C_1$-$C_6$-halogenalkyl, cyclopentyl, cyclohexyl, phenyl, tolyl, and benzyl.

The anion can be written in the form [$RCO_3^-$], wherein [$RCO_3^-$] is a carbonate wherein R represents one to three radicals out of the group consisting of, hydrogen, $C_1$-$C_6$-alkyl, aryl, heteroaryl, $C_3$-$C_7$-cycloalkyl, halogen, cyanide, $OR^c$, $SR^c$, $NR^cR^d$, $COR^c$, $COOR^c$, CO—$NR^cR^d$, wherein $R^c$ and/or $R^d$, is one of the group consisting of hydrogen, $C_1$-$C_6$-alkyl, $C_1$-$C_6$-halogenalkyl, cyclopentyl, cyclohexyl, phenyl, tolyl, and benzyl. Alternatively, the anion may be carbonate, i.e. $CO_3^{2-}$.

The anion may be choline carbonate. By sorbing $CO_2$ the choline carbonate (CAS 59612-50-9) may form choline hydrogencarbonate (CAS 78-73-9). The choline hydrogencarbonate may be regenerated to choline carbonate again by heating the same.

The anion may be selected from acetate, carbonate, dichloroacetate, chloroacetate, difluoroacetate, fluoroacetate, methoxyacetate, cyanacetate, glykolate, benzoate, pyruvate, malonate, pivalate, the deprotonated or partially deprotonated form of the following monovalent or polyvalent acids: formic acid, acetic acid, propionic acid, butyric acid, valeric acid, caproic acid, enanthic acid, caprylic acid, capric acid, lauric acid, myristic acid, palmitic acid, stearic acid, arachidic acid, O-acetylsalicylic acid, sorbic acid, pivalic acid, fatty acids, isoleucine, alanine, leucine, asparagine, lysine, aspartic acid, methionine, cysteine, phenylalanine, glutamic acid, threonine, glutamine, tryptophan, glycine, valine, proline, serine, tyrosine, arginine, histidine, ornithine, taurine, sulfamic acid, aldonic acids, ulosonic acids, uronic acids, aldaric acids, gluconic acid, glucuronic acid, mannonic acid, mannuronic acid, galactonic acid, galacturonic acid, ascorbic acid, glyceric acid, xylonic acid, neuraminic acid, iduronic acid, oxalic acid, malonic acid, succinic acid, glutaric acid, adipic acid, pimelic acid, suberic acid, azelaic acid, sebacic acid, phthalic acid, isophthalic acid, terephthalic acid, maleic acid, fumaric acid, glutaconic acid, traumatic acid, muconic acid, citric acid, isocitric acid, aconitic acid, propane-1,2,3-tricarboxylic acid, trimesic acid, glycolic acid, lactic acid, malic acid, citric acid, tartaric acid, mandelic acid, 2-hydroxybutyric acid, 3-hydroxybutyric acid, 4-hydroxybutyric acid, 3-hydroxypropionic acid, 3-hydroxyisovaleric acid, salicylic acid, polycarboxylic acids, and mixtures thereof.

Cations may be selected out of the group consisting of: mono-, di-, tri-, or tetra-alkyl-ammonium, mono-, di-, tri-, or tetra-alkylphosphonium, trialkylbenzylammonium, with one to four independent $C_1$ to $C_6$-alkyl chains; 1,3-dialkylimidazolium, 1,2,3-trialkylimidazolium, N-alkylpyridinium, N,N-dialkylpiperidinium, N,N-dialkylmorpholinium, N,N-dialkylpyrrolidinium with one or two independent $C_1$ to $C_6$-alkyl chains; and mono-, di-, tri-, tetra-, penta- or hexa-alkylguanidinium, with one to six independent $C_1$ to $C_6$-alkyl chains, which may be substituted with one or more hydroxy- or alkoxy-groups, or 2-Hydroxyethyltrimethylammonium (Choline), 2-Acetoxyethyl-trimethylammonium (Acetylcholine) or Guanidinium (protonated Guanidine, CAS 113-00-8).

The cation may be a quaternary or protonated cation chosen from the group consisting of ammonium, phosphonium, sulfonium, piperidinium, pyrrolidinium and morpholinium.

The cation may be one chosen from the group consisting of trialkylmethylammonium, tetramethylammonium, triethylmethylammonium, tributylmethylammonium, trioctylmethylammonium, trialkylammonium, trimethylammonium, triethylammonium, tributylammonium, and trioctylammonium. The trialkylmethylammonium may be a $C_1$-$C_{10}$-trialkylmethylammonium.

The cation may be one chosen from the group consisting of tetramethylammonium, triethylmethylammonium, tributylmethylammonium, and trioctylmethylammonium.

A method using an ionic liquid to sorb vapors having an electric multi-pole moment is provided. The vapor may be $CO_2$ or $H_2O$, while the ionic liquid may be an organic salt having a melting temperature of below 200° C., below 100° C., or preferably below 20° C. such as organic salts that may be quaternary salts having a generic formula of $([A]^+)_a[B]^{a-}$ The described method may be useful for processes in which $CO_2$ or $H_2O$ are to be removed as pure substance or a gas or vapor mixture independent of whether $CO_2$ or $H_2O$ is a main or secondary component or a working medium. Applications may include using an ionic liquid as a desiccant in a dehumidifier or air conditioning unit based on ionic liquid/$H_2O$ or ionic liquid/$CO_2$ as working media, or removing $CO_2$ or $H_2O$ out of, for example, ambient air.

Cations of the above ionic liquids may be selected from tetramethylammonium, tetraethylammonium, tetrabutylammonium tetrahexylammonium, tetraoctylammonium, trimethylammonium, triethylammonium, tributylammonium, triethylmethylammonium, tributylmethylammonium, trihexylmethylammonium, trioctylmethylammonium, tris-(2-Hydroxyethyl)methylammonium, tris-(2-Hydroxyethyl)ethylammonium, bis-(2-hydroxyethyl)dimethylammonium, 1,3-dimethylimidazolium, 1-ethyl-3-methylimidazolium, 1-propyl-3-methylimidazolium, 1-butyl-3-methylimidazolium, 1,2,3-trimethylimidazolium, 1,3-diethylimidazolium, 1,3-dibutylimidazolium, 1-ethyl-2,3-dimethylimidazolium, 1-butyl-2,3-dimethylimidazolium, 1-(2-hydroxyethyl)-3-methylimidazolium, 1-(3-hydroxypropyl)-3-methylimidazolium, 1-(2-hydroxypropyl)-3-methylimidazolium, 1-(4-hydroxy-butyl)-3-methylimidazolium, 1-(3-hydroxy-butyl)-3-methylimidazolium, 1-(2-hydroxy-butyl)-3-methylimidazolium, 1-(2-methoxyethyl)-3-methylimidazolium, 1-(3-methoxypropyl)-3-methylimidazolium, 1-(2-methoxypropyl)-3-methylimidazolium, 1-(4-methoxy-butyl)-3-methylimidazolium, 1-(3-methoxy-butyl)-3-methylimidazolium, 1-(2-methoxy-butyl)-3-methylimidazolium, 1-(2-ethoxyethyl)-3-methylimidazolium, 1-(3-ethoxypropyl)-3-methylimidazolium, 1-(2-ethoxypropyl)-3-methylimidazolium, 1-(4-ethoxy-butyl)-3-methylimidazolium, 1-(3-ethoxy-butyl)-3-methylimidazolium, 1-(2-ethoxy-butyl)-3-methylimidazolium, 1-allyl-3-methylimidazolium, 1-allyl-2,3-dimethylimidazolium, N,N-dimethylmorpholinium, N,N-diethylmorpholinium, N,N-dibutylmorpholinium, N-ethyl-N-methylmorpholinium, N-butyl-N-methylmorpholinium, N,N-dimethylpiperidinium, N,N-diethylpiperidinium, N,N-dibutylpiperidinium, N-ethyl-N-methylpiperidinium, N-butyl-N-methylpiperidinium, N,N-dimethylpyrrolidinium, N,N-diethylpyrrolidinium, N,N-dibutylpyrrolidinium, N-ethyl-N-methylpyrrolidinium, N-butyl-N-methylpyrrolidinium, 2-Hydroxyethyltrimethylammonium (choline), 2-acetoxyethyl-trimethylammonium (acetylcholine), guanidinium (protonated guanidine, CAS 113-00-8), tetramethylguanidinium, pentamethylguanidinium, hexamethylguanidinium triethylmethylphosphonium, tripropylmethylphosphonium, tributylmethylphosphonium, tetraethylphosphonium, tetrapropylphosphonium, tetrabutylphosphonium, tetramethylphosphonium, and mixtures thereof.

$CO_2$ Removal Cycle

The cycle may be able to provide a high level of removal of $CO_2$ from the gas stream and also a high concentration of $CO_2$ in the concentrated stream when the material has a higher equilibrium pickup of $CO_2$ at conditions in the adsorber than it has in the desorber. In embodiments, the sorbent material may hold more $CO_2$ at ambient temperature and the desired final $CO_2$ concentration, than it does at the desorption temperature and in a 100% $CO_2$ atmosphere.

Figure 6:
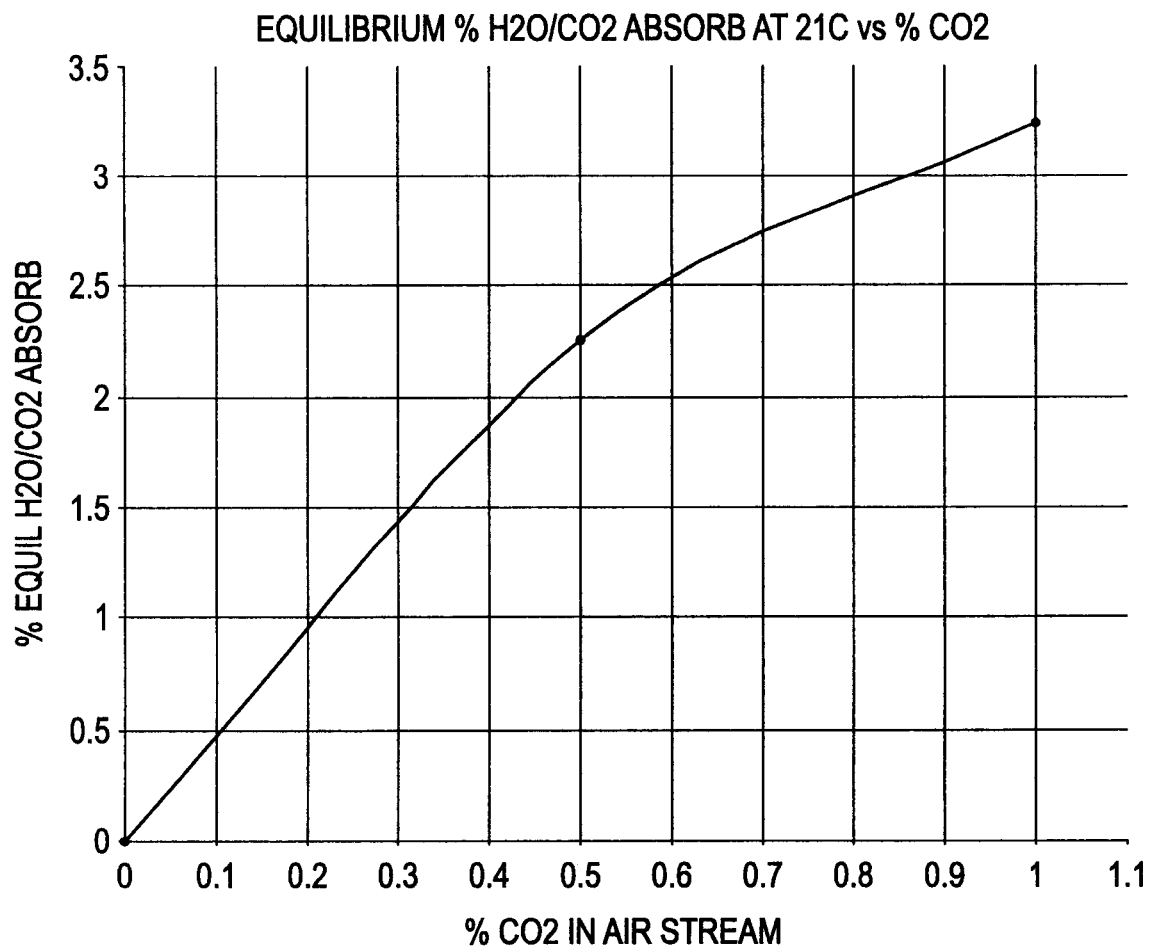
FIG. 6 shows an isotherm of EMMIM acetate with varying levels of $CO_2$.

FIG. 6 an isotherm of EMMIM acetate is shown in varying levels of $CO_2$, up to 1%, and less than 1% relative humidity. It clearly shows that even at a 1% $CO_2$ concentration in the gas the sorbent will hold over 3% of its weight in $CO_2$.

Figure 7:
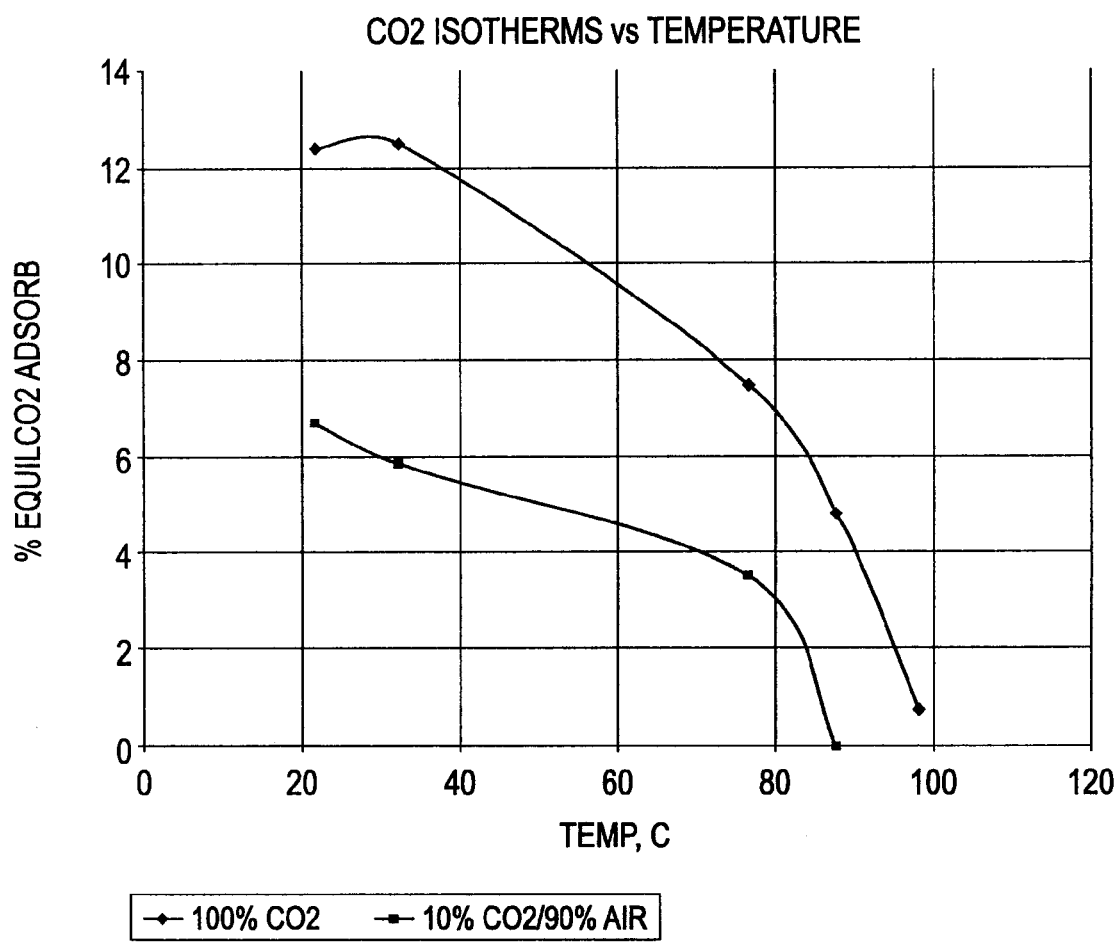
FIG. 7 shows an isotherm for EMMIM acetate in a 100% $CO_2$ atmosphere at higher temperatures.

In FIG. 7 the isotherm for the same material in a 100% $CO_2$ atmosphere at higher temperatures is shown. It can be seen that that material gives up nearly all of its $CO_2$ at temperatures at nearly 100° C. in a pure $CO_2$ environment. Thus, the possibility of rendering the $CO_2$ level below 1% or lower seems practical if regeneration takes place at temperatures above 90° C. in pure or less than pure $CO_2$ environments.

Allowing the ionic liquid adsorbent to flow counter to the flow of the dried stack gas stream may optimize the system. Thus, the most concentrated adsorbent contacts the most cleansed gas stream, and as the sorbent picks up $CO_2$ it contacts a gas stream with increasing $CO_2$ concentration enabling further adsorption of $CO_2$ until a maximum amount is collected. Once again, as low a flow of sorbent material as possible should be utilized so as to maximize the concentration of $CO_2$ in the diluted sorbent. However, by reducing the flow to low levels, such as less that 50 kg sorbent per kg $CO_2$ transferred. The heat of condensation may play a role and the gas stream will increase in temperature as the $CO_2$ stream is removed. Thus, a separate cooling means may be used in the absorber to remove this heat and allow the sorbent to sorb the $CO_2$ at as low a temperature as is possible without detrimental energy costs.

Figure 8:
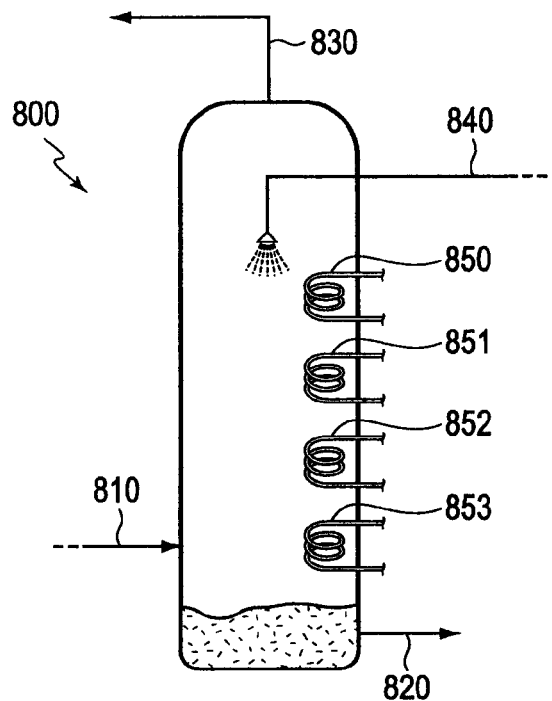
FIG. 8 shows an embodiment of an absorber tower in a $CO_2$ removal system optimized with cooling structures.

In embodiments, such as the one shown in FIG. 8, the absorber tower 800 may include cooling structures 850-853. The number of cooling structures is not limited and will vary according to the dimensions of the absorber tower and the cooling requirements. The structures function to cool both the flow of liquid sorbent, as well as the flow of $CO_2$ laden gas. The cooling structures may be cooled by any means, such as, for example, cooling tower water or other liquid or gas coolants. The cooling structures keep the gas stream temperature close to the local ambient wet bulb temperature. For example, a gas stream 810 from the moisture removal system may enter at the bottom of the absorber tower and the sorbent 840 may be sprayed by a sprayer into the absorber tower. The cooling structure may have variable temperatures (i.e., the temperature of cooling structure 850 may be different than the temperature of cooling structure 851 an so on). However, final cooling to a lower level can be employed towards the end of the contact region between the gas and the sorbent, around cooling structure 850, so as to further enhance the removal of the $CO_2$ from the gas stream. This allows a $CO_2$ reduced gas stream 830 to exit the absorber tower, while $CO_2$ rich sorbent is collected in a liquid state at the bottom of the absorber tower 800, where it may be transferred to the desorber.

Examples of these types of cooling surfaces are illustrated by Lowenstein, for example in U.S. Pat. Nos. 5,351,497; 6,745,826; and 7,269,966. However, simpler methods, such as employing more standard cooling coils throughout the contact zone between the sorbent and the gas stream may also be used.

Figure 9:
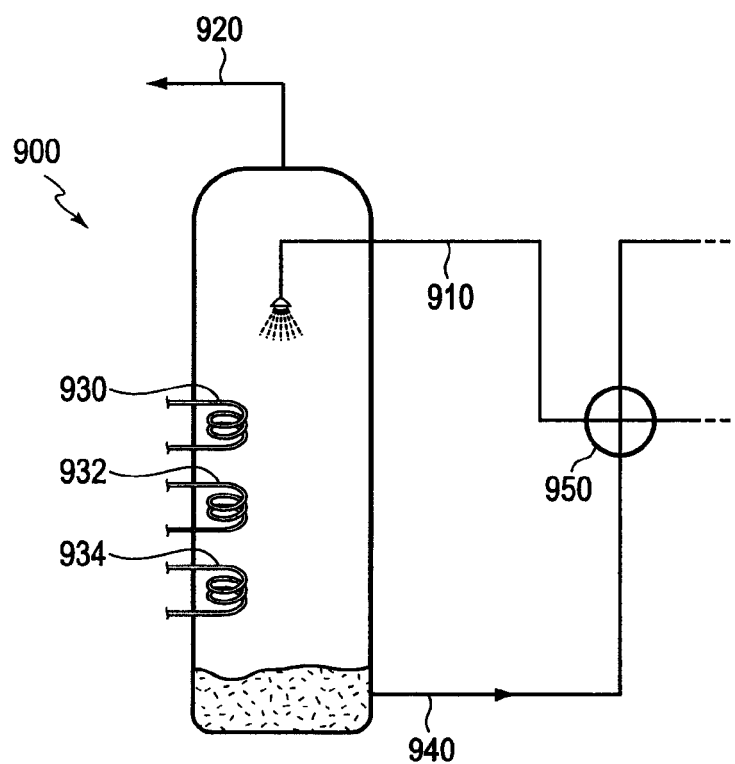
FIG. 9 shows an embodiment of a desorber tower in a $CO_2$ removal system optimized with heating structures.

Referring to FIG. 9, the thus diluted $CO_2$ laden sorbent may then be transferred to the desorber tower 900 or plurality of towers. To reduce heat requirements, the sorbent 910 may first enter a heat exchanger 950 with the concentrated sorbent 940 returning from the desorber tower 900. In the desorber tower, the sorbent is flowed over heated surfaces 930-934, where it warms and liberates the $CO_2$ to the surrounding $CO_2$-rich environment. The number of heated surfaces is not limited and will vary depending on the size of the desorber tower and the heating requirements. The $CO_2$ gas 920 may then be removed by a pump and pressurized to the desired level for transport and use. The pump may also reduce the pressure in the one or more of the desorber towers 900 to below ambient pressure so as to further remove $CO_2$ from the sorbent or to enable regeneration at lower temperatures. Thus, the decision on the final pressure of the regenerator is one of energy optimization (i.e., the cost of higher grade heat to increase the sorbent to a higher temperature) to more fully regenerate the sorbent and the resulting loss of power from the plant, versus the added electrical or energy cost to power the compressor or pump with a higher differential pressure. The heating of the sorbent may also be staged, wherein the sorbent is preheated to a lower temperature using lower grade heat, or is heated in a first vessel on surfaces at a lower temperature before being transferred to a next vessel with higher temperature surfaces for further enrichment, etc. In this manner the amount of high-grade heat utilized can be minimized. For example, the heated surfaces in the desorber tower near the entrance of the $CO_2$-rich stream may be heated by low-grade heat, such as from the coolant stream from the moisture removal system, and the heated surfaces near the $CO_2$ free sorbent may be heated by high-grade heat.

Solid Sorbent

Figure 10:
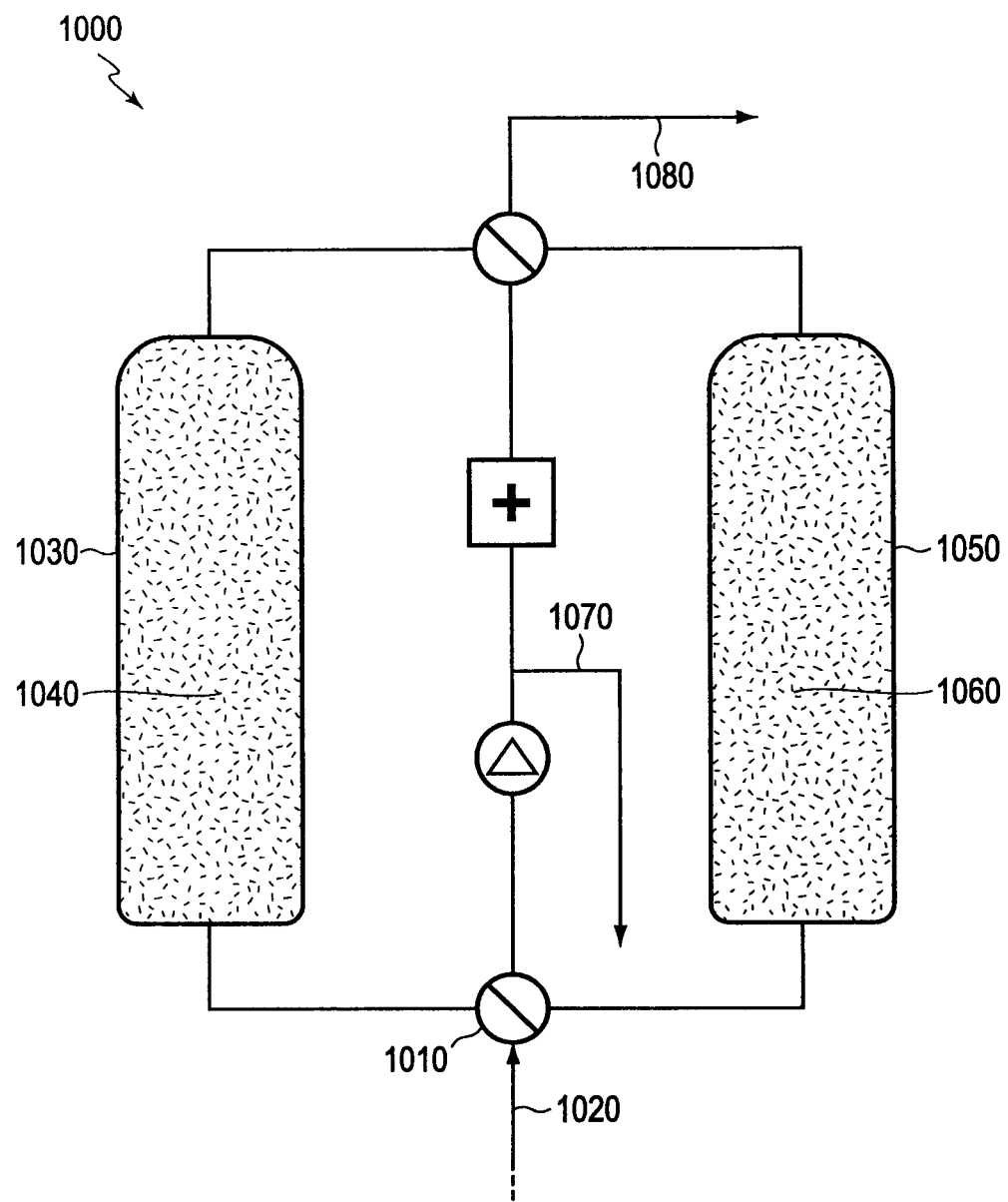
FIG. 10 shows an embodiment of a solid desiccant $CO_2$ removal system.

In embodiments using solid sorbent, such as that shown in FIG. 10, for the $CO_2$ capture and removal, a multiple tower system 1000 may be used. The $CO_2$ laden gas 1020 from the above moisture removal system is directed, such as by a two-way valve 1010, to the bottom of a tower 1030 containing sorbent. As the $CO_2$ laden gas passes through the sorbent 1040, the sorbent sorbs the $CO_2$ and allows a $CO_2$ free gas 1080 to exit the top of the tower. Once the sorbent in the tower becomes saturated with $CO_2$, the $CO_2$ laden gas is directed by the two-way valve 1010 to a different tower 1050 that is packed with a solid sorbent, and the sorbent in the first tower is regenerated.

The sorbent may be regenerated by heating the tower, such as by introducing hot air into the tower or by other external or internal heating means. The application of heat to the saturated sorbent allows the $CO_2$ that was sorbed to the sorbent to be released in a gaseous state. The gaseous $CO_2$ may then be removed through a $CO_2$ bleed line 1070 as isolated $CO_2$ that may be further processed for storage or use.

Solid sorbents for use in the solid sorbent $CO_2$ removal system may be selected from molecular sieve materials, such as 4A, 5A or 13X, zeolite X, zeolite Y, silica, mordenite or activated carbon. The solid sorbent may also be a metal oxide. Suitable metal oxides may include alkali earth metal oxides, transition metal oxides, alkaline earth metal oxide, such as CaO and MgO.

Finally, it should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises," and the like, does not exclude the presence of elements or steps other than those listed in any claim or the specification as a whole. The singular reference of an element does not exclude the plural reference of such elements and vice-versa. In a device claim enumerating several means, several of these means may be embodied by one and the same item of software or hardware. The mere fact that certain measures are recited in mutually different dependent claims does not indicate that a combination of these measures cannot be used to advantage.

What is claimed is:

1. A method for capturing $CO_2$ from a gas stream comprising:
    cooling the gas stream and concurrently removing moisture from the gas stream as a condensate;
    passing the gas stream through a first section of an enthalpy exchange device to remove moisture;
    then exposing the gas stream to a $CO_2$ sorbent;
    sorbing the $CO_2$ from the gas stream with the sorbent to generate a desorbed gas stream;
    passing the desorbed gas stream through a second section of the enthalpy exchange device to accept moisture from the gas stream in the first section; and
    extracting the $CO_2$ from the sorbent into a concentrated $CO_2$ gas stream.

2. The method according to claim 1, wherein an absolute humidity of the gas stream that is exposed to the sorbent is less than about 4 g/kg.

3. The method according to claim 1, wherein an absolute humidity of the gas stream that is exposed to the sorbent is less than about 1 g/kg.

4. The method according to claim 1, wherein the sorbent is a regenerative sorbent that is regenerated by heating.

5. The method according to claim 1, wherein the sorbent is selected from the group consisting of molecular sieve materials, zeolite, silica, activated carbon, mordenite, and metal oxides.

6. The method according to claim 5, wherein the sorbent is 13X molecular sieve.

7. The method according to claim 1, wherein the sorbent is an ionic liquid having the following general formula: $[Q^+]_n [Z^{n-}]$, where Q is a cation and Z is an anion.

8. The method according to claim 7, wherein
    the anion is selected from the group consisting of acetate, carbonate, dichloroacetate, chloroacetate, difluoroacetate, fluoroacetate, methoxyacetate, cyanacetate, glykolate, benzoate, pyruvate, malonate, pivalate, the deprotonated or partially deprotonated form of the following monovalent or polyvalent acids: formic acid, acetic acid, propionic acid, butyric acid, valeric acid, caproic acid, enanthic acid, caprylic acid, capric acid, lauric acid, myristic acid, palmitic acid, stearic acid, arachidic acid, O-acetylsalicylic acid, sorbic acid, pivalic acid, fatty acids, isoleucine, alanine, leucine, asparagine, lysine, aspartic acid, methionine, cysteine, phenylalanine, glutamic acid, threonine, glutamine, tryptophan, glycine, valine, proline, serine, tyrosine, arginine, histidine, ornithine, taurine, sulfamic acid, aldonic acids, ulosonic acids, uronic acids, aldaric acids, gluconic acid, glucuronic acid, mannonic acid, mannuronic acid, galactonic acid, galacturonic acid, ascorbic acid, glyceric acid, xylonic acid, neuraminic acid, iduronic acid, oxalic acid, malonic acid, succinic acid, glutaric acid, adipic acid, pimelic acid, suberic acid, azelaic acid, sebacic acid, phthalic acid, isophthalic acid, terephthalic acid, maleic acid, fumaric acid, glutaconic acid, traumatic acid, muconic acid, citric acid, isocitric acid, aconitic acid, propane-1,2,3-tricarboxylic acid, trimesic acid, glycolic acid, lactic acid, malic acid, citric acid, tartaric acid, mandelic acid, 2-hydroxybutyric acid, 3-hydroxybutyric acid, 4-hydroxybutyric acid, 3-hydroxypropionic acid, 3-hydroxyisovaleric acid, salicylic acid, polycarboxylic acids, and mixtures thereof, and
    the cation is selected from the group consisting of tetramethylammonium, tetraethylammonium, tetrabutylammonium tetrahexylammonium, tetraoctylammonium, trimethylammonium, triethylammonium, tributylammonium, triethylmethylammonium, tributylmethylammonium, trihexylmethylammonium, trioctylmethylammonium, tris-(2-Hydroxyethyl)methylammonium, tris-(2-Hydroxyethyl)ethylammonium, bis-(2-hydroxyethyl)dimethylammonium, 1,3-dimethylimidazolium, 1-ethyl-3-methylimidazolium, 1-propyl-3-methylimidazolium, 1-butyl-3-methylimidazolium, 1,2,3-trimethylimidazolium, 1,3-diethylimidazolium, 1,3-dibutylimidazolium, 1-ethyl-2,3-dimethylimidazolium, 1-butyl-2,3-dimethylimidazolium, 1-(2-hydroxyethyl)-3-methylimidazolium, 1-(3-hydroxypropyl)-3-methylimidazolium, 1-(2-hydroxypropyl)-3-methylimidazolium, 1-(4-hydroxy-butyl)-3-methylimidazolium, 1-(3-hydroxy-butyl)-3-methylimidazolium, 1-(2-hydroxy-butyl)-3-methylimidazolium, 1-(2-methoxyethyl)-3-methylimidazolium, 1-(3-methoxypropyl)-3-methylimidazolium, 1-(2-methoxypropyl)-3-methylimidazolium, 1-(4-methoxy-butyl)-3-methylimidazolium, 1-(3-methoxy-butyl)-3-methylimidazolium, 1-(2-methoxy-butyl)-3-methylimidazolium, 1-(2-ethoxyethyl)-3-methylimidazolium, 1-(3-ethoxypropyl)-3-methylimidazolium, 1-(2-ethoxypropyl)-3-methylimidazolium, 1-(4-ethoxy-butyl)-3-methylimidazolium, 1-(3-ethoxy-butyl)-3-methylimidazolium, 1-(2-ethoxy-butyl)-3-methylimidazolium, 1-allyl-3-methylimidazolium, 1-allyl-2,3-dimethylimidazolium, N,N-dimethylmorpholinium, N,N-diethylmorpholinium, N,N-dibutylmorpholinium, N-ethyl-N-methylmorpholinium, N-butyl-N-methylmorpholinium, N,N-dimethylpiperidinium, N,N-diethylpiperidinium, N,N-dibutylpiperidinium, N-ethyl-N-methylpiperidinium, N-butyl-N-methylpiperidinium, N,N-dimethylpyrrolidinium, N,N-diethylpyrrolidinium, N,N-dibutylpyrrolidinium, N-ethyl-N-methylpyrrolidinium, N-butyl-N-methylpyrrolidinium, 2-Hydroxyethyltrimethylammonium (choline), 2-acetoxyethyl-trimethylammonium (acetylcholine), guanidinium (protonated guanidine, CAS 113-00-8), tetramethylguanidinium, pentamethylguanidinium, hexamethylguanidinium triethylmethylphosphonium, tripropylmethylphosphonium, tributylmethylphosphonium, tetraethylphosphonium, tetrapropylphosphonium, tetrabutylphosphonium, tetramethylphosphonium, and mixtures thereof.

9. The method according to claim 1, further comprising a step of adding moisture to the gas stream before the step of cooling the gas stream and concurrently removing moisture.

10. The method according to claim 9, wherein the step of adding moisture to the gas stream reduces the temperature of the gas stream.

11. The method according to claim 10, wherein the step of cooling the gas stream and concurrently removing moisture results in a greater temperature drop than caused by the step of adding moisture.

12. The method according to claim 9, wherein the step of cooling the gas stream and concurrently removing moisture removes a greater amount of moisture from the gas stream than is added by the step of adding moisture.

13. The method according to claim 1, wherein the step of cooling the gas stream and concurrently removing moisture reduces the temperature of the gas stream to below the dew point.

14. The method according to claim 1, wherein the step of cooling the gas stream and concurrently removing moisture reduces the temperature of the gas stream to less than 32° C.

15. The method according to claim 1, wherein the step of cooling the gas stream and concurrently removing moisture reduces the temperature of the gas stream to less than 20° C.

16. The method according to claim 1, wherein after the step of cooling the gas stream and concurrently removing moisture, the gas stream has a relative humidity near saturation.

17. The method according to claim 1, wherein the temperature of the gas stream is substantially constant before and after the step of passing the gas stream through the first section of the enthalpy exchange device to remove moisture.

18. The method according to claim 1, wherein the concentrated $CO_2$ gas stream has a $CO_2$ concentration of above 80%.

19. The method according to claim 1, wherein the concentrated $CO_2$ gas stream has a $CO_2$ concentration of above 90%.

20. The method according to claim 1, wherein the energy of desorbing the $CO_2$ is in the range of from 300 to about 850 BTU/lb.

21. The method according to claim 1, further comprising controlling the extraction of $CO_2$ from the sorbent by changing at least one of a temperature or a pressure of the gas stream to minimize energy waste.

* * * * *